(12) United States Patent
Beck et al.

(10) Patent No.: US 11,305,635 B2
(45) Date of Patent: Apr. 19, 2022

(54) TRANSMISSION FOR A MOTOR VEHICLE

(71) Applicant: ZF Friedrichshafen AG, Friedrichshafen (DE)

(72) Inventors: Stefan Beck, Eriskirch (DE); Matthias Horn, Tettnang (DE); Johannes Kaltenbach, Friedrichshafen (DE); Uwe Griesmeier, Markdorf (DE); Fabian Kutter, Kressbronn (DE); Thomas Martin, Weissensberg (DE); Michael Wechs, Weißensberg (DE); Gerhard Niederbrucker, Friedrichshafen (DE); Jens Moraw, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/286,348

(22) PCT Filed: Sep. 16, 2019

(86) PCT No.: PCT/EP2019/074643
§ 371 (c)(1),
(2) Date: Apr. 16, 2021

(87) PCT Pub. No.: WO2020/078631
PCT Pub. Date: Apr. 23, 2020

(65) Prior Publication Data
US 2021/0370758 A1 Dec. 2, 2021

(30) Foreign Application Priority Data

Oct. 18, 2018 (DE) .................... 10 2018 217 859.3

(51) Int. Cl.
*B60K 1/00* (2006.01)
*B60K 6/365* (2007.10)
(Continued)

(52) U.S. Cl.
CPC ............. *B60K 6/547* (2013.01); *B60K 1/00* (2013.01); *B60K 1/02* (2013.01); *B60K 6/365* (2013.01);
(Continued)

(58) Field of Classification Search
CPC .............. F16H 2200/201–2200/2028; F16H 2200/2046–2200/2061; F16H 2200/2097; B60K 1/00–02; B60K 6/20–547
See application file for complete search history.

(56) References Cited

U.S. PATENT DOCUMENTS 7,500,930 B2 * 3/2009 Raghavan .............. F16H 3/728
475/5
2007/0129203 A1 * 6/2007 Raghavan .............. F16H 3/728
475/275
(Continued)

FOREIGN PATENT DOCUMENTS

DE 102008041887 A1 3/2010
DE 102013225207 A1 * 6/2015 ............. B60K 6/365
(Continued)

OTHER PUBLICATIONS

International Search Report (English Translation) PCT/EP2019/074643, dated Nov. 28, 2019. (2 pages).

*Primary Examiner* — Ernesto A Suarez
*Assistant Examiner* — Lillian T Nguyen
(74) *Attorney, Agent, or Firm* — Dority & Manning, P.A.

(57) ABSTRACT

A transmission (G) for a motor vehicle includes an electric machine (EM1), a first input shaft (GW1), a second input shaft (GW2), an output shaft (GWA), three planetary gear sets (P1, P2, P3), and at least six shift elements (A, B, C, D, E, F). Different gears are implementable by selectively actuating the at least six shift elements (A, B, C, D, E, F) and, in addition, in interaction with the electric machine (EM1), different operating modes are implementable. A (Continued)

drive train for a motor vehicle with such a transmission (G) and to a method for operating same are also provided.

19 Claims, 22 Drawing Sheets

(51) Int. Cl.
    *B60K 6/547*     (2007.10)
    *B60K 6/387*     (2007.10)
    *B60K 1/02*     (2006.01)
    *B60K 6/445*     (2007.10)

(52) U.S. Cl.
    CPC .............. *B60K 6/387* (2013.01); *B60K 6/445* (2013.01); *B60K 2001/001* (2013.01); *B60Y 2200/91* (2013.01); *B60Y 2200/92* (2013.01); *F16H 2200/0043* (2013.01); *F16H 2200/0078* (2013.01); *F16H 2200/201* (2013.01); *F16H 2200/2046* (2013.01); *F16H 2200/2048* (2013.01); *F16H 2200/2094* (2013.01)

(56) References Cited

U.S. PATENT DOCUMENTS

| | | | |
|---|---|---|---|
| 2007/0197335 A1* | 8/2007 | Raghavan | ................ B60K 6/40 475/5 |
| 2007/0298924 A1* | 12/2007 | Bucknor | ................ B60K 6/365 475/5 |
| 2011/0263370 A1 | 10/2011 | Borntraeger et al. | |

FOREIGN PATENT DOCUMENTS

| | | | | |
|---|---|---|---|---|
| DE | 102014218610 A1 | | 3/2016 | |
| DE | 102014218612 A1 | * | 3/2016 | ............ B60K 6/365 |
| DE | 102014218625 A1 | * | 3/2016 | ............ B60K 6/48 |
| DE | 102014225168 A1 | * | 6/2016 | ............ F16H 3/66 |
| DE | 102016207439 A1 | | 11/2017 | |
| WO | WO 2010/029035 | | 3/2010 | |

* cited by examiner

| Gear | A | B | C | D | E | F |
|---|---|---|---|---|---|---|
| 1 | X |   |   |   | X |   |
| 2 | X |   |   | X |   |   |
| 3.1 | X | X |   |   |   |   |
| 3.2 |   | X |   |   |   | X |
| 3.3 |   |   |   | X |   | X |
| 3.4 |   | X |   | X |   |   |
| 3.5 |   | X |   |   | X |   |
| 3.6 |   | X |   |   |   |   |
| 4.1 | X |   | X |   |   |   |
| 4.2 |   |   | X |   |   | X |
| 4.3 |   |   | X | X |   |   |
| 4.4 |   |   | X |   | X |   |
| 4.5 |   |   | X |   |   |   |
| HZG |   |   |   |   | X | X |
| E1 | X |   |   |   |   |   |
| E2 |   |   |   |   |   | X |

Fig. 13

| Condition | Gear EM1 | Gear EM2 | Gear ICE | K0 | A | B | C | D | E | F |
|---|---|---|---|---|---|---|---|---|---|---|
| I | E1 | 0 | 0 | | x | | | | | |
| II | E2 | 0 | 0 | | | | | | | x |
| III | 0 | 3.6 | 0 | | | x | | | | |
| IV | 0 | 4.5 | 0 | | | | | x | | |
| V | E1 | 1 | 0 | | x | | | | x | |
| VI | E1 | 2 | 0 | | x | | | x | | |
| VII | E1 | 3.1 | 0 | | x | x | | | | |
| VIII | E2 | 3.2 | 0 | | | | x | | | x |
| IX | E2 | 3.3 | 0 | | | | | x | | x |
| X | 0 | 3.4 | 0 | | | x | | x | | |
| XI | 0 | 3.5 | 0 | | | x | | | x | |
| XII | E1 | 4.1 | 0 | | x | | x | | | |
| XIII | E2 | 4.2 | 0 | | | | x | | | x |
| XIV | 0 | 4.3 | 0 | | | | x | x | | |
| XV | 0 | 4.4 | 0 | | | | x | | x | |
| XVI | E2 | EZG | 0 | | | | | | x | x |
| XVII | E1 | 1 | 1 | x | x | | | | x | |
| XVIII | E1 | 2 | 2 | x | x | | | x | | |
| XIX | E1 | 3.1 | 3.1 | x | x | x | | | | |
| XX | E2 | 3.2 | 3.2 | x | | | x | | | x |
| XXI | E2 | 3.3 | 3.3 | x | | | | x | | x |
| XXII | 0 | 3.4 | 3.4 | x | | x | | x | | |
| XXIII | 0 | 3.5 | 3.5 | x | | x | | | x | |
| XXIV | 0 | 3.6 | 3.6 | x | | x | | | | |
| XXV | E1 | 4.1 | 4.1 | x | x | | x | | | |
| XXVI | E2 | 4.2 | 4.2 | x | | | x | | | x |
| XXVII | 0 | 4.3 | 4.3 | x | | | x | x | | |
| XXVIII | 0 | 4.4 | 4.4 | x | | | x | | x | |
| XXIX | 0 | 4.5 | 4.5 | x | | | x | | | |
| XXX | E2 | EZG | 0 | x | | | | | x | x |

Fig. 16

TRANSMISSION FOR A MOTOR VEHICLE

CROSS-REFERENCE TO RELATED APPLICATIONS

The present application is related and has right of priority to German Patent Application No. 102018217859.3 filed in the German Patent Office on Oct. 18, 2018 and is a nationalization of PCT/EP2019/074643 filed in the European Patent Office on Sep. 16, 2019, both of which are incorporated by reference in their entirety for all purposes.

FIELD OF THE INVENTION

The invention relates generally to a transmission for a motor vehicle, including an electric machine. Moreover, the invention relates generally to a motor vehicle drive train, in which an aforementioned transmission is utilized, and to a method for operating a transmission.

BACKGROUND

In the case of hybrid vehicles, transmissions are known which also include, in addition to a gear set, one or multiple electric machine(s). In this case, the transmission is usually configured to be multi-stage, i.e., multiple different ratios are selectable, as gears, between an input shaft and an output shaft by actuating appropriate shift elements, wherein this is preferably automatically carried out. Depending on the arrangement of the shift elements, the shift elements are clutches or also brakes. The transmission is utilized in this case for suitably implementing an available tractive force of a prime mover of the motor vehicle with respect to various criteria. In this case, the gears of the transmission are mostly also utilized in interaction with the at least one electric machine for implementing purely electric driving. Frequently, the at least one electric machine can also be integrated in the transmission in order to implement various operating modes in different ways.

DE 10 2014 218 610 A1 describes a transmission for a hybrid vehicle, which includes, in addition to a first input shaft and an output shaft, three planetary gear sets and an electric machine. Moreover, in one variant, six shift elements are provided, via which different power paths are achieved from the first input shaft to the output shaft while implementing different gears and, in addition, different integrations of the electric machine can be configured. Here, purely electric driving can also be implemented simply by transmitting power via the electric machine.

BRIEF SUMMARY OF THE INVENTION

Example aspects of the present invention provide an alternative embodiment of the transmission for a motor vehicle known from the prior art, with which, with a compact design, different operating modes can be implemented in a suitable way.

According to example aspects of the invention, a transmission includes an electric machine, a first input shaft, a second input shaft, an output shaft, as well as a first planetary gear set, a second planetary gear set, and a third planetary gear set. The planetary gear sets include multiple elements, wherein, preferably, a first element, a second element, and a third element are associated with each of the planetary gear sets. In addition, a first shift element, a second shift element, a third shift element, a fourth shift element, a fifth shift element, and a sixth shift element are provided, via the selective actuation of which different power paths can be implemented while shifting different gears. It is particularly preferred when at least four different gears can be formed, by the ratio, between the first input shaft and the output shaft. Moreover, a rotor of the electric machine is connected to the second input shaft.

Within the meaning of the invention, a "shaft" is understood to be a rotatable component of the transmission, via which associated components of the transmission are rotationally fixed to each other or via which a connection of this type is established upon actuation of an appropriate shift element. The particular shaft can connect the components to each other axially or radially or also both axially and radially. The particular shaft can also be present as an intermediate piece, via which a particular component is connected, for example, radially.

Within the meaning of the invention, "axially" means an orientation in the direction of a longitudinal central axis, along which the planetary gear sets are arranged coaxially to one another. "Radially" is then understood to mean an orientation in the direction of the diameter of a shaft that lies on this longitudinal central axis.

Preferably, the output shaft of the transmission includes a tooth system, via which the output shaft is then operatively connected, in the motor vehicle drive train, to a differential gear arranged axially parallel to the output shaft. In this case, the tooth system is preferably provided at a mounting interface of the output shaft, wherein this mounting interface of the output shaft is preferably situated axially in the area of an end of the transmission, at which a mounting interface of the first input shaft is also provided, the mounting interface establishing the connection to the upstream prime mover. This type of arrangement is particularly suitable for the application in a motor vehicle with a drive train aligned transversely to the direction of travel of the motor vehicle.

Alternatively, an output of the transmission can also be provided, in principle, at an axial end of the transmission situated opposite to a mounting interface of the first input shaft. In this case, a mounting interface of the output shaft is then designed at an axial end of the output shaft coaxially to a mounting interface of the first input shaft, so that the input and the output of the transmission are located at opposite axial ends of the transmission. A transmission configured in this way is suitable for the application in a motor vehicle with a drive train aligned in the direction of travel of the motor vehicle.

According to a first example variant of the invention, the planetary gear sets are arranged in the sequence first planetary gear set, second planetary gear set, and, finally, third planetary gear set axially following the mounting interface of the first input shaft. According to an alternative, second example variant of the invention, the planetary gear sets follow the mounting interface of the first input shaft in the sequence second planetary gear set, third planetary gear set and, finally, first planetary gear set, however.

Example aspects of the invention now encompasses the technical teaching that the first input shaft is rotationally fixed to the second element of the first planetary gear set, while the output shaft is rotationally fixed to the third element of the first planetary gear set. Moreover, the second input shaft is rotationally fixed to the third element of the second planetary gear set, whereas the first element of the second planetary gear set is fixed. Moreover, two of the elements of the first planetary gear set are connectable to each other in a rotationally fixed manner via the second shift element, while the first element of the first planetary gear set is fixable by the third shift element. The second element of the second planetary gear set is connectable to the first input shaft in a rotationally fixed manner via the fourth shift element, whereas the first input shaft and the second input shaft are connected to each other in a rotationally fixed manner by the fifth shift element.

In other words, in the transmission according to example aspects of the invention, the first input shaft is therefore permanently rotationally fixed to the second element of the first planetary gear set, while the output shaft is permanently connected to the third element of the first planetary gear set in a rotationally fixed manner. In addition, the second input shaft is permanently rotationally fixed to the third element of the second planetary gear set, and so the electric machine is also permanently coupled to the third element of the second planetary gear set. In addition, the first element of the second planetary gear set is also permanently fixed and, thereby, permanently prevented from making a turning motion.

By engaging the second shift element, two of the elements of the first planetary gear set are rotationally fixed to each other, which results in an interlock of the first planetary gear set. Actuating the third shift element brings about a fixation of the first element of the first planetary gear set, and so, consequently, the first element of the first planetary gear set is prevented from making a turning motion. The fourth shift element, in the actuated condition, connects the second element of the second planetary gear set and the first input shaft to each other in a rotationally fixed manner, whereas an engagement of the fifth shift element results in a rotationally fixed connection of the first input shaft and the second input shaft.

The second shift element, the fourth shift element, and the fifth shift element are present as clutches, which, upon actuation, each synchronize, if necessary, the particular components of the transmission joined directly to the clutches, with respect to turning motions of the particular components and, thereafter, connect the components to each other in a rotationally fixed manner. However, the third shift element is present as a brake, which, upon actuation, fixes the component of the transmission joined directly thereto and, consequently, prevents the component from making a turning motion.

A particular rotationally fixed connection of the rotatable components of the transmission is preferably implemented, according to example aspects of the invention, via one or also multiple intermediate shaft(s), which can also be present, in this case, as short intermediate pieces when the components are positioned in a spatially dense manner. Specifically, the components that are permanently rotationally fixed to each other can each be present either as individual components that are rotationally fixed to each other, or also as single pieces. In the second case mentioned above, the particular components and the optionally present shaft are then formed by one common component, wherein this is implemented, in particular, for the case in which the particular components are situated spatially close to each other in the transmission.

In the case of components of the transmission that are rotationally fixed to each other only upon actuation of a particular shift element, a connection is also preferably implemented via one or also multiple intermediate shaft(s).

A fixation takes place, in particular, by way of a rotationally fixed connection to a rotationally fixed component of the transmission, which is preferably a permanently non-rotating component, preferably a housing of the transmission, a part of such a housing, or a component rotationally fixed thereto.

Within the meaning of the invention, the "connection" of the rotor of the electric machine to the second input shaft of the transmission is to be understood as a connection of such a type that a constant rotational-speed dependence prevails between the rotor of the electric machine and the second input shaft.

Overall, a transmission according to example aspects of the invention is distinguished by a compact design, low component loads, good gearing efficiency, and low losses.

According to one example embodiment of the invention, the sixth shift element, upon actuation, rotationally fixes the first element and the second element of the third planetary gear set to each other, or the first element and the third element of the third planetary gear set to each other, or the second element and the third element of the third planetary gear set to each other. In addition, the first element of the third planetary gear set is fixable via the first shift element, while the second element of the third planetary gear set is rotationally fixed to the output shaft, and the third element of the third planetary gear set is connected to the second element of the second planetary gear set in a rotationally fixed manner.

In other words, an engagement of the sixth shift element brings about the rotationally fixed connection of two elements of the third planetary gear set, which results in an interlock of the third planetary gear set. Specifically, the sixth shift element, upon actuation, can rotationally fix the first element and the second element of the third planetary gear set to each other, or the second element and the third element of the third planetary gear set to each other, or the first element and the third element of the third planetary gear set to each other. The first shift element, upon actuation, fixes the first element of the third planetary gear set, however, and so, consequently, this is prevented from making a turning motion. In addition, the second element of the third planetary gear set is permanently rotationally fixed to the output shaft, while the third element of the third planetary gear set is permanently connected to the second element of the second planetary gear set in a rotationally fixed manner. In this case, the first shift element is present as a brake, while the sixth shift element is designed as a clutch.

According to an alternative example design option of the invention, the second element of the second planetary gear set can be rotationally fixed to the output shaft via the sixth shift element. Moreover, with respect to the third planetary gear set, there is a first coupling of the first element of the third planetary gear set to a rotationally fixed component, a second coupling of the second element of the third planetary gear set to the output shaft, and a third coupling of the third element of the third planetary gear set to the second element of the second planetary gear set, wherein, of these couplings, two couplings are present as permanently rotationally fixed connections, while, with respect to the remaining coupling, a rotationally fixed connection is implementable by the first shift element.

In this example design option of the invention, upon actuation of the sixth shift element, the second element of the second planetary gear set and the output shaft are therefore connected to each other in a rotationally fixed manner. In addition, with respect to the third planetary gear set, three couplings are present, of which the first coupling is present between the first element of the third planetary gear set and a rotationally fixed component of the transmission, while the second coupling is present between the second element of the third planetary gear set and the output shaft, and the third coupling is present between the third element of the third planetary gear set and the second element of the second planetary gear set. Of these couplings, two couplings are designed as permanently rotationally fixed connections, while, with respect to the remaining coupling, a rotationally fixed connection is formed only by engaging the first shift element.

Specifically, in a first example variant of the aforementioned design option, the second element of the third planetary gear set is therefore permanently rotationally fixed to the output shaft and the third element of the third planetary gear set is permanently rotationally fixed to the second element of the second planetary gear set, whereas the first element of the third planetary gear set is fixed by engaging the first shift element. In this case, the first shift element is present as a brake, while the sixth shift element is designed as a clutch.

Alternatively, the first element of the third planetary gear set is permanently fixed, wherein the first element of the third planetary gear set can be rotationally fixed to the first element of the second planetary gear set. Moreover, the second element of the third planetary gear set is permanently rotationally fixed to the output shaft, whereas the third element of the third planetary gear set is connected to the second element of the second planetary gear set in a rotationally fixed manner only by engaging the first shift element. The first shift element and the sixth shift element are each present as a clutch.

According to a further, alternative example variant, the first element of the third planetary gear set is permanently fixed and can also be rotationally fixed to the first element of the second planetary gear set, while the third element of the third planetary gear set is permanently rotationally fixed to the second element of the second planetary gear set and the second element of the third planetary gear set is connected to the output shaft in a rotationally fixed manner only by actuating the first shift element. In this case as well, the first shift element and the sixth shift element are each present as a clutch.

According to one example embodiment of the invention, selective engagement of the six shift elements results gears that differ in terms of ratio and an auxiliary gear between the first input shaft and the output shaft. A first gear can be implemented between the first input shaft and the output shaft by actuating the first shift element and the fifth shift element, in which travel takes place with the simultaneous integration of a prime mover joined at the first input shaft, and the electric machine. Moreover, a second gear results between the first input shaft and the output shaft by engaging the first shift element and the fourth shift element, wherein travel takes place in this case as well with the simultaneous integration of the upstream prime mover and the electric machine.

In addition, a third gear can be implemented between the first input shaft and the output shaft in a first variant by engaging the first shift element and the second shift element. In addition, the third gear can also be selected, in a second variant, by actuating the second and the sixth shift elements, in a third variant by engaging the fourth and the sixth shift elements, in a fourth variant by actuating the second and the fourth shift elements, in a fifth variant by engaging the second and the fifth shift elements, and in a sixth variant by engaging the second shift element. This is the case because the third gear results already by engaging the second shift element, since the first input shaft and the output shaft are then connected to each other in a rotationally fixed manner via the interlocked, first planetary gear set, and so travel can take place via the upstream prime mover. The electric machine can be decoupled, since, in this case, only the second shift element is loaded with torque and, in addition, the second input shaft can remain idle. As a result, zero-load losses of the electric machine can be avoided. However, a shift into the first five variants of the third gear has the advantage that the electric machine is also integrated and, as a result, hybrid driving can take place.

In addition, a fourth gear can be implemented between the first input shaft and the output shaft in a first variant by actuating the first shift element and the third shift element, wherein the fourth gear also results, in a second variant, by engaging the third shift element and the sixth shift element, in a third variant by actuating the third shift element and the fourth shift element, in a fourth variant by engaging the third shift element and the fifth shift element, and in a fifth variant by engaging the third shift element. Once again, in the fifth variant of the fourth gear, pure travel via the upstream prime mover can take place, since, when the third shift element is engaged, the first input shaft and the output shaft are coupled to each other via the first planetary gear set. The electric machine can also be decoupled in this case, since, when the third shift element is engaged, only the third shift element is loaded with torque and the second input shaft can remain idle. Consequently, zero-load losses of the electric machine can also be avoided in the fifth variant of the fourth gear. An implementation of the first four variants of the fourth gear has the advantage that hybrid driving can take place due to the simultaneous integration of the upstream prime mover and the electric machine.

Finally, an auxiliary gear results by engaging the fifth shift element and the sixth shift element.

Given a suitable selection of stationary transmission ratios of the planetary gear sets, a transmission ratio range which is suitable for the application in a motor vehicle is implemented as a result. In this case, gear shifts between the gears can be implemented, in which only the condition of two shift elements, in each case, is always to be varied, in that one of the shift elements contributing to the preceding gear is to be disengaged and another shift element is to be engaged in order to implement the subsequent gear. As a further consequence thereof, a shift between the gears can take place very rapidly.

Due to the connection of the electric machine to the second input shaft of the transmission, different operating modes can also be achieved in a simple way.

A first gear between the second input shaft and the output shaft can be utilized for purely electric driving, wherein this first gear results by engaging the first shift element. As a result, the rotor of the electric machine is coupled to the output shaft via the second planetary gear set and the third planetary gear set, wherein a ratio of this first gear corresponds to a ratio of the first gear that is effective between the first input shaft and the output shaft.

In addition, a second gear can also be implemented between the second input shaft and the output shaft for purely electric driving. The sixth shift element is to be actuated in order to implement this second gear, and so the second input shaft and, thereby, also the rotor of the electric machine are then connected to the output shaft via the second planetary gear set. A ratio of this second gear, which is effective between the second input shaft and the output shaft, corresponds to a ratio of the auxiliary gear between the first input shaft and the output shaft.

Starting from purely electric driving in the first gear, which is effective between the second input shaft and the output shaft, the upstream prime mover can then be started into the first gear, which is effective between the first input shaft and the output shaft, into the second gear, which is effective between the first input shaft and the output shaft, into the first variant of the third gear, which is effective between the first input shaft and the output shaft, or in the first variant of the fourth gear, which is effective between the first input shaft and the output shaft, since the first shift element contributes to each of these.

A start of the upstream prime mover into the second variant and into the third variant of the third gear, which is effective between the first input shaft and the output shaft, into the second variant of the fourth gear, which is effective between the first input shaft and the output shaft, or into the auxiliary gear can also take place from the second gear, which is effective between the second input shaft and the output shaft.

As a further operating mode, a charging operation of an electric accumulator can also be implemented, in that only the fourth shift element is engaged and, thereby, a coupling of the first input shaft to the second input shaft and, thereby, also to the electric machine is established via the second planetary gear set. The second input shaft rotates faster than the first input shaft. At the same time, a force-fit connection to the output shaft is not established, and therefore the transmission is in a neutral position. Apart from a charging operation, a start of the upstream prime mover via the electric machine can also be implemented as a result. Alternatively, a charging or starting operation can also be implemented by actuating the fifth shift element, however, wherein, in this case, the first input shaft and the second input shaft are directly connected to each other in a rotationally fixed manner. In this case as well, a force-fit connection to the output shaft is not established, and so charging can be implemented in a problem-free manner when the electric machine is operated as a generator or also starting can be implemented in a problem-free manner when the electric machine is operated as an electric motor.

Moreover, powershifts with tractive force support can be implemented. During the gearchange between the first gear, which is effective between the first input shaft and the output shaft, and the second gear, which is effective between the first input shaft and the output shaft, the tractive force with the first shift element engaged can be supported via the electric machine, wherein the synchronization of the shift element to be engaged takes place via a closed-loop control of the rotational speed of the upstream prime mover. Alternatively, however, this can also take place by using synchronized shift elements or also by using another, separate synchronizing mechanism, such as a transmission brake or also one further electric machine, which can be operatively connected directly or indirectly to the first input shaft. If one further shift element, as a separating clutch, is also provided on the input side of the input shaft, the inertial mass of the upstream drive machine can be decoupled during the synchronization.

A gearchange under load can also take place between the second gear, which is effective between the first input shaft and the output shaft, and the first variant of the third gear, which is effective between the first input shaft and the output shaft, with the first shift element engaged. This is also implementable, in addition, during a gearchange between the first variant of the third gear, which is effective between the first input shaft and the output shaft, and the first variant of the fourth gear, which is effective between the first input shaft and the output shaft, since the first shift element contributes to each of the two variants in this case as well.

The transmission according to example aspects of the invention can also be operated in such a way that a rotational-speed reduction of the electric machine is achieved during driving. It is therefore possible to initially drive in a hybrid manner in the first variant of the fourth gear, in that the first shift element initially remains engaged either after a gear shift from the third gear into the fourth gear with torque assistance from the electric machine or after a start of the prime mover into the fourth gear. In order to now reduce a rotational speed of the electric machine in the fourth gear at higher ground speeds, however, a change-over can be carried out from the first variant of the fourth gear into the second variant of the fourth gear, since the rotor of the electric machine has a lower rotational speed here than in the first variant of the fourth gear. This change-over takes place while obtaining the tractive force via the upstream prime mover, with the third shift element engaged. Initially, the load-free, first shift element is disengaged and, subsequent thereto, the load-free, sixth shift element is engaged, wherein the rotational-speed adaptation takes place via closed-loop control of the rotational speed of the electric machine.

A separate shift element is not necessary for decoupling the upstream prime mover, since, in the second variant of the fourth gear, which is effective between the first input shaft and the output shaft, the upstream prime mover can be decoupled by disengaging the third shift element. As a result, the second gear is then implemented, which is effective between the second input shaft and the output shaft. In addition, in the case of a vehicle that is slowing down, a downshift from the fourth gear, which is effective between the first input shaft and the output shaft, into the third gear, which is effective between the first input shaft and the output shaft, can be prepared, in that, initially, a change-over takes place from the second variant into the first variant of the fourth gear and, in the process, the tractive force is obtained via the upstream prime mover, with the third shift element engaged. In the first variant of the fourth gear, the first shift element is engaged, which becomes necessary in order to support the tractive force via the electric machine as part of the downshift from the fourth gear into the third gear.

Alternatively, a downshift from the fourth gear, which is effective between the first input shaft and the output shaft, into the third gear, which is effective between the first input shaft and the output shaft, can also be implemented with the sixth shift element engaged, however, in that a change-over takes place between the second variant of the fourth gear and the second variant of the third gear, to the implementation of which the sixth shift element contributes, in each case. The electric machine then supports the tractive force. Thereafter, the sixth shift element can be disengaged, if necessary, and, subsequently, the first shift element can be engaged, wherein a synchronization takes place via the electric machine and a support of the tractive force takes place via the upstream prime mover. As a result, the rotational speed of the electric machine can also be varied in the third gear, which is effective between the first input shaft and the output shaft.

As one further example design option of the invention, a further electric machine is provided, the rotor of which is connected at the first input shaft. Such an example embodiment has the advantage that further driving modes can be achieved as a result. In addition, as a result, a start of the upstream prime mover can be implemented immediately, if necessary, if the prime mover is designed as an internal combustion engine. In addition, the additional electric machine can support the upstream prime mover in the synchronization of shift elements.

According to one further example embodiment of the invention, the first input shaft can be connected in a rotationally fixed manner, via a seventh shift element, to a connection shaft, which, in turn, is then preferably coupled within a motor vehicle drive train to the prime mover connected upstream from the transmission. The seventh shift element can be designed, in principle, as a force-locking or also as a form-locking shift element in this case, although it is particularly preferred when the seventh shift element is present as a dog clutch. Via the seventh shift element, the upstream prime mover can therefore also be completely decoupled from the transmission, so that a purely electric operation is implementable in a problem-free manner.

According to a further example design option of the invention, the first input shaft can be rotationally fixed to the first element of the third planetary gear set via a further shift element. As a result, a starting function for forward travel can be implemented when driving via the first input shaft. The upstream prime mover is connected to the first element of the third planetary gear set via the further shift element, while the electric machine is connected to the third element of the third planetary gear set via the constant ratio of the second planetary gear set and the connection to the output shaft is established via the second element of the third planetary gear set. In this starting function, a ratio for the upstream prime mover results, which is higher than the ratio of the first gear that is effective between the first input shaft and the output shaft. The starting function therefore expands the overall gear ratio. The aforementioned example design option can only be implemented in the transmission according to example aspects of the invention, however, when the planetary gear sets are arranged in the sequence second planetary gear set, third planetary gear set, and, finally, first planetary gear set.

In one example refinement of the invention, one or multiple shift element(s) is/are each implemented as a form-locking shift element. In this case, the particular shift element is preferably designed either as a constant-mesh shift element or as a lock-synchronizer mechanism. Form-locking shift elements have the advantage over friction-locking shift elements that lower drag losses occur in the disengaged condition, and therefore a better efficiency of the transmission can be achieved. In particular, in the transmission according to example aspects of the invention, all shift elements are implemented as form-locking shift elements, and therefore the lowest possible drag losses can be achieved. Preferably, the seventh shift element, which is provided, if necessary, and the further shift element are both designed as force-locking shift elements. In principle, however, one shift element or multiple shift elements could also be configured as force-locking shift elements, for example, as lamellar shift elements.

Within the scope of example aspects of the invention, the planetary gear sets can each be present as a negative or minus planetary gear set, provided it allows for a connection of the elements, wherein the first element of the particular planetary gear set is a sun gear, the second element of the particular planetary gear set is a planet carrier, and the third element of the particular planetary gear set is a ring gear. A minus planetary gear set is composed, in a way known, in principle, to a person skilled in the art, of the elements sun gear, planet carrier, and ring gear, wherein the planet carrier, rotatably mounted, guides at least one planet gear, although preferably multiple planet gears, which each individually intermesh with the sun gear and with the surrounding ring gear.

Alternatively thereto, one planetary gear set or even both planetary gear sets could also be present as a positive or plus planetary gear set, however, provided the connection of the particular elements permits this, wherein the first element of the particular planetary gear set is a sun gear in this case, the second element of the particular planetary gear set is a ring gear, and the third element of the particular planetary gear set is a planet carrier. In a plus planetary gear set as well, the elements sun gear, ring gear, and planet carrier are present, wherein the latter guides at least one planet gear pair, in which one planet gear is meshed with the internal sun gear and the other planet gear is meshed with the surrounding ring gear, and the planet gears are intermeshed with each other.

Where permitted by a connection of the individual elements, a minus planetary gear set can be converted into a plus planetary gear set, wherein, as compared to the design as a minus planetary gear set, the ring gear connection and the planet carrier connection are to be interchanged, and a stationary transmission ratio is to be increased by one. Conversely, a plus planetary gear set could also be replaced by a minus planetary gear set, provided the connection of the elements of the transmission enables this. In this case, as compared to the plus planetary gear set, the ring gear connection and the planet carrier connection would also need to be interchanged, and a stationary transmission ratio would need to be reduced by one. Within the scope of example aspects of the invention, the three planetary gear sets are each preferably designed as a minus planetary gear set, however.

According to one further example embodiment of the invention, the first shift element and the sixth shift element are combined to form a shift element pair, with which one actuating element is associated. The first shift element, on the one hand, and the sixth shift element, on the other hand, can be actuated via the actuating element starting from a neutral position. This has the advantage that, due to this combination, the number of actuating elements can be reduced and, thereby, the manufacturing complexity can also be reduced.

Alternatively or also in addition to the aforementioned example variants, the second shift element and the third shift element are combined to form a shift element pair, with which one actuating element is associated. The second shift element, on the one hand, and the third shift element, on the other hand, can be actuated from a neutral position via this actuating element. As a result, the manufacturing complexity can be reduced, in that, due to the combination of the two shift elements to form a shift element pair, one actuating unit can be utilized for both shift elements.

In addition, alternatively or also in addition to the two aforementioned example variants, the fourth shift element and the fifth shift element are combined to form a shift element pair, with which one actuating element is associated. The fourth shift element, on the one hand, and the fifth shift element, on the other hand, can be actuated via this actuating element starting from a neutral position. As a result of this as well, the manufacturing complexity can be reduced, since an actuation of the two shift elements can therefore take place via one common actuating unit.

It is particularly preferred, however, when all three aforementioned shift element pairs are implemented, and so the six shift elements of the transmission can be actuated via three actuating elements. As a result, a particularly low manufacturing complexity can be achieved.

According to one example embodiment of the invention, the rotor of the electric machine is rotationally fixed to the second input shaft. Alternatively, according to one example design option of the invention, the rotor is connected to the second input shaft via at least one gear stage. The electric machine can be arranged either coaxially to the planetary gear sets or so as to be situated axially offset with respect thereto. In the former case, the rotor of the electric machine can either be rotationally fixed directly to the second input shaft or can be coupled thereto via one or also multiple intermediate gear stage(s), wherein the latter allows for a more favorable configuration of the electric machine with higher rotational speeds and lower torques. The at least one gear stage can be designed as a spur gear stage and/or as a planetary gear stage in this case. In the case of a coaxial arrangement of the electric machine, at least two of the planetary gear sets can then also, more preferably, be arranged axially in the area of the electric machine as well as radially internally with respect thereto, so that the axial installation length of the transmission can be shortened.

If the electric machine is provided axially offset with respect to the planetary gear sets, however, a coupling takes place via one or multiple intermediate gear stage(s) and/or a flexible traction drive mechanism. The one or the multiple gear stage(s) can also be implemented individually, in this case, either as a spur gear stage or as a planetary gear stage. A flexible traction drive mechanism can be either a belt drive or a chain drive.

If a further electric machine is also provided, a rotor of this further electric machine can also be either rotationally fixed to the first input shaft directly or can be coupled to the first input shaft via at least one gear stage. The at least one gear stage can be a spur gear stage or a planetary gear stage or also a flexible traction drive mechanism. In addition, the further electric machine can be provided coaxially or also axially offset with respect to the first input shaft and, thereby, also to the planetary gear sets.

Within the scope of example aspects of the invention, a starting component can be installed upstream from the transmission, for example a hydrodynamic torque converter or a friction clutch. This starting component can then also be an integral part of the transmission and acts to configure a starting process, in that the starting component enables a slip speed between the prime mover, which is designed, in particular, as an internal combustion engine, and the first input shaft of the transmission. In this case, one of the shift elements of the transmission or the separating clutch, which may be present, can also be designed as such a starting component, in that it is present as a frictional shift element. In addition, a one-way clutch with respect to the transmission housing or to another shaft can be arranged on each shaft of the transmission, in principle.

The transmission according to the invention is, in particular, part of a motor vehicle drive train for a hybrid or electric vehicle and is then arranged between a prime mover of the motor vehicle, which is configured as an internal combustion engine or as an electric machine, and further components of the drive train, which are arranged downstream in the direction of power flow to driving wheels of the motor vehicle. In this case, the first input shaft of the transmission is either permanently coupled to a crankshaft of the internal combustion engine or to the rotor shaft of the electric machine in a rotationally fixed manner or is connectable thereto via an intermediate separating clutch or a starting component, wherein a torsional vibration damper can also be provided between an internal combustion engine and the transmission. On the output end, the transmission is then preferably coupled, within the motor vehicle drive train, to a differential gear of a drive axle of the motor vehicle, wherein a connection to an interaxle differential can also be present in this case, however, via which a distribution to multiple driven axles of the motor vehicle takes place. The differential gear or the interaxle differential can be arranged with the transmission in one common housing in this case. A torsional vibration damper, which is optionally present, can also be integrated into this housing.

Within the meaning of the invention, the expressions that two components of the transmission are "connected" or "coupled" or "are connected to each other" mean a permanent coupling of these components, and therefore said components cannot rotate independently of each other. In that respect, no shift element is provided between these components, which can be elements of the planetary gear sets and/or also shafts and/or a rotationally fixed component of the transmission. Instead, the appropriate components are coupled to each other with a consistent rotational speed dependence.

However, if a shift element is provided between two components, these components are not permanently coupled to each other. Instead, a coupling is carried out only by actuating the intermediate shift element. In this case, an actuation of the shift element means, within the meaning of the invention, that the particular shift element is transferred into an engaged condition and, consequently, synchronizes the turning motions, if necessary, of the components connected directly thereto. In the case of an embodiment of the particular shift element as a form-locking shift element, the components directly connected to each other in a rotationally fixed manner via the shift element rotate at the same rotational speed, while, in the case of a force-locking shift element, speed differences can exist between the components also after an actuation of the same shift element. This intentional or also unintentional condition is nevertheless referred to, within the scope of the invention, as a rotationally fixed connection of the particular components via the shift element.

The invention is not limited to the specified combination of features of the main claim or the claims dependent thereon. In addition, individual features can be combined with one another, provided they arise from the claims, the description of preferred embodiments of the invention which follows, or directly from the drawings. References in the claims to the drawings via the use of reference signs is not intended to limit the scope of protection of the claims.

BRIEF DESCRIPTION OF THE DRAWINGS

Advantageous embodiments of the invention, which are explained in the following, are represented in the drawings, in which:

FIG. 13 shows an exemplary shift pattern of the transmissions from FIGS. 2 to 12;

FIG. 16 shows a representation in table form of different conditions of the motor vehicle drive train from FIG. 1 with a transmission according to FIG. 14 or 15;

DETAILED DESCRIPTION

Figure 1:
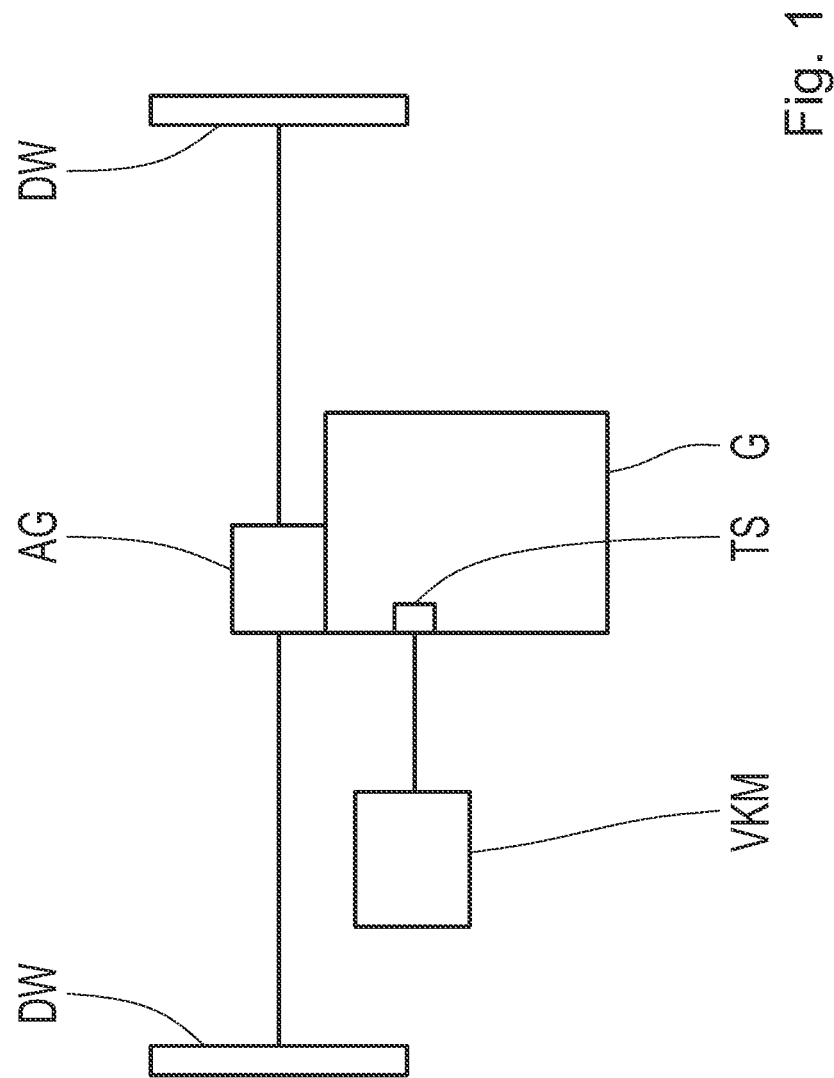
FIG. 1 shows a diagrammatic view of a motor vehicle drive train.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a diagrammatic view of a motor vehicle drive train of a hybrid vehicle, wherein, in the motor vehicle drive train, an internal combustion engine VKM is connected to a transmission G via an intermediate torsional vibration damper TS. Connected downstream from the transmission G, on the output end thereof, is a differential gear AG, via which drive power is distributed to driving wheels DW of a drive axle of the motor vehicle. The transmission G and the torsional vibration damper TS are arranged in a common housing of the transmission G in this case, into which the differential gear AG can then also be integrated. As is also apparent in FIG. 1, the internal combustion engine VKM, the torsional vibration damper TS, the transmission G, and also the differential gear AG are aligned transversely to a direction of travel of the motor vehicle.

Figure 2:
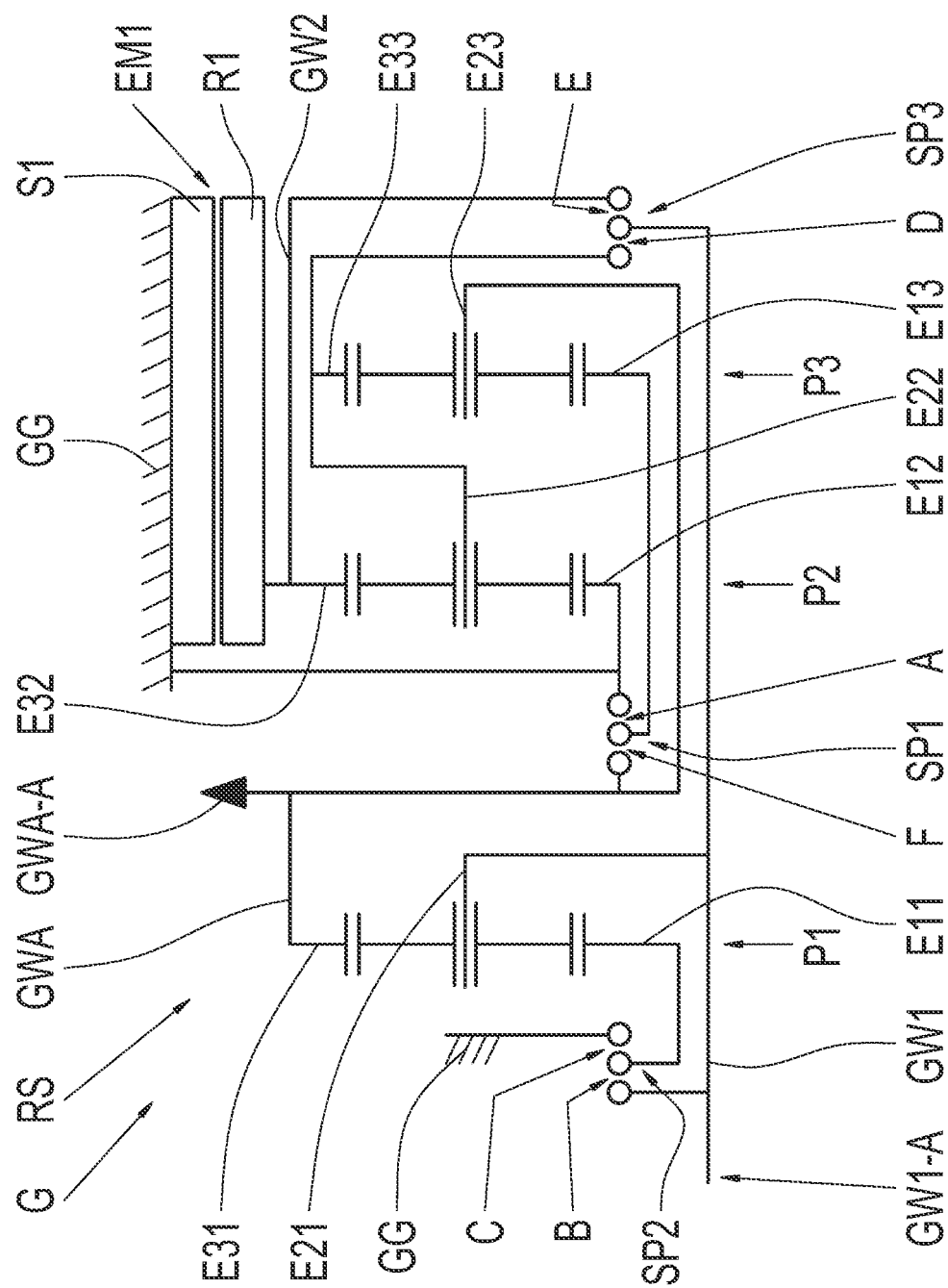
FIGS. 2 through 12 each show a diagrammatic view of a transmission of the type that can be utilized in the motor vehicle drive train from FIG. 1.

FIG. 2 shows a schematic of the transmission G according to a first embodiment of the invention. As is apparent, the transmission G is composed of a gear set RS and an electric machine EM1, which are both arranged in the housing of the transmission G. The gear set RS includes three planetary gear sets P1, P2, and P3, wherein each of the planetary gear sets P1, P2, and P3 includes a first element E11 and E12 and E13, respectively, a second element E21 and E22 and E23, respectively, and a third element E31 and E32 and E33, respectively. The first element E11 and E12 and E13 is formed by a sun gear of the planetary gear set P1 and P2 and P3, respectively, while the second element E21 and E22 and E23 of the planetary gear set P1 and P2 and P3, respectively, is a planet carrier, and the third element E31 and E32 and E33 of the planetary gear set P1 and P2 and P3, respectively, is a ring gear.

In the present case, the first planetary gear set P1, the second planetary gear set P2, and the third planetary gear set P3 are each therefore present as a negative or minus planetary gear set. The particular planet carrier thereof guides at least one planet gear in a rotatably mounted manner; the planet gear is meshed with the particular radially internal sun gear as well as with the particular radially surrounding ring gear. It is particularly preferred, however, when multiple planet gears are provided in the first planetary gear set P1, in the second planetary gear set P2, and also in the third planetary gear set P3.

Provided this is permitted by the connection, one or also several of the planetary gear sets P1 through P3 could also each be designed as a positive or plus planetary gear set, wherein, as compared to the design as a minus planetary gear set, the second element E21 and E22 and E23, respectively, is then formed by the respective ring gear and the third element E31 and E32 and E33, respectively, is formed by the respective planet carrier and, in addition, a respective stationary transmission ratio must be increased by one. In the case of a plus planetary gear set, the planet carrier then guides at least one pair of planet gears in a rotatably mounted manner. One planet gear of said pair of planet gears is meshed with the radially internal sun gear and one planet gear is meshed with the radially surrounding ring gear, and the planet gears intermesh with each other.

As is apparent in FIG. 2, the transmission G includes a total of six shift elements in the form of a first shift element A, a second shift element B, a third shift element C, a fourth shift element D, a fifth shift element E, and a sixth shift element F. The shift elements A, B, C, D, E, and F are each designed as form-locking shift elements and are preferably present as constant-mesh shift elements. While the third shift element C is designed as a brake, the remaining shift elements A, B, D, E, and F are present as clutches.

A first input shaft GW1 of the transmission G is permanently rotationally fixed to the second element E21 of the first planetary gear set P1 and is rotationally fixable to the first element E11 of the first planetary gear set P1 via the second shift element B, which results in an interlock of the first planetary gear set P1 due to the associated rotationally fixed connection of the first element E11 and of the second elements E21 of the first planetary gear set P1. The first element E11 of the first planetary gear set P1 is also fixable, by engaging the third shift element C, at a rotationally fixed component GG, which is, in particular, the transmission housing of the transmission G or a portion of this transmission housing.

As is also apparent in FIG. 2, the first element E12 of the second planetary gear set P2 is permanently fixed at the rotationally fixed component GG and, thereby, is permanently prevented from making a turning motion, while the third element E32 of the second planetary gear set P2 is permanently connected to a second input shaft GW2 of the transmission G. The second input shaft GW2 is permanently connected to a rotor R1 of the electric machine EM1 in a rotationally fixed manner, while a stator S1 of the electric machine EM1 is fixed at the rotationally fixed component GG. In addition, the second input shaft GW2 is rotationally fixable to the first input shaft GW1 by engaging the fifth shift element E.

In addition, the second element E22 of the second planetary gear set P2 and the third element E33 of the third planetary gear set P3 are permanently connected to each other in a rotationally fixed manner and, jointly, is connectable to the first input shaft GW1 in a rotationally fixed manner via the fourth shift element D. The first element E13 of the third planetary gear set P3 is fixable at the rotationally fixed component GG by engaging the first shift element A, wherein, moreover, the first element E13 of the third planetary gear set P3 is rotationally fixable, via the sixth shift element F, to an output shaft GWA of the transmission G, which is permanently connected in a rotationally fixed manner to the third element E31 of the first planetary gear set P1 and to the second element E23 of the third planetary gear set P3. Therefore, the actuation of the sixth shift element F results in an interlock of the third planetary gear set P3, since the first element E13 and the second element E23 of the third planetary gear set P3 are then connected to each other in a rotationally fixed manner.

The first input shaft GW1 as well as the output shaft GWA form a mounting interface GW1-A and GWA-A, respectively, wherein the mounting interface GW1-A in the motor vehicle drive train from FIG. 1 is utilized for a connection at the internal combustion engine VKM, while the transmission G is connected at the mounting interface GWA-A to the downstream differential gear AG. The mounting interface GW1-A of the first input shaft GW1 is formed at an axial end of the transmission G, while the mounting interface GWA-A of the output shaft GWA is situated in the area of the same axial end and, here, is aligned transversely to the mounting interface GW1-A of the first input shaft GW1. In addition, the first input shaft GW1, the second input shaft GW2, and the output shaft GWA are arranged coaxially to one another.

The planetary gear sets P1, P2, and P3 are also situated coaxially to the input shafts GW1 and GW2 and the output shaft GWA, wherein they are arranged in the sequence first planetary gear set P1, second planetary gear set P2, and third planetary gear set P3 axially subsequent to the mounting interface GW1-A of the first input shaft GW1. Likewise, the electric machine EM1 is also located coaxially to the planetary gear sets P1, P2, and P3 and, thereby, also to the input shafts GW1 and GW2 and the output shaft GWA, wherein the electric machine EM1 is provided axially at the level of the second planetary gear set P2 and of the third planetary gear set P3 and radially surrounding these.

As is also apparent from FIG. 2, the first shift element A and the sixth shift element F are arranged axially between the first planetary gear set P1 and the second planetary gear set P2, wherein, specifically, the first shift element A and the sixth shift element F are situated axially between the mounting interface GWA-A of the output shaft GWA and the second planetary gear set P2, and the sixth shift element F is situated axially adjacent to the mounting interface GWA-A. The sixth shift element F and the first shift element A are situated axially directly next to each other and radially at the same level and are combined to form a shift element pair SP1, in that a common actuating element is associated with the first shift element A and the sixth shift element F1, via which the sixth shift element F, on the one hand, and the first shift element A, on the other hand, can be actuated from a neutral position.

The second shift element B and the third shift element C are arranged axially on a side of the first planetary gear set P1 facing the mounting interface GW1-A of the first input shaft GW1, wherein the third shift element C is situated axially adjacent to the first planetary gear set P1. The second shift element B and the third shift element C are also located axially directly next to each other and radially at the same level and include a common actuating element, via which the second shift element B, on the one hand, and the third shift element C, on the other hand, can be actuated from a neutral position. In that respect, the second shift element B and the third shift element C are combined to form a shift element pair SP2.

Finally, the fourth shift element D and the fifth shift element E are situated axially on a side of the third planetary gear set P3 facing away from the second planetary gear set P2, wherein the fourth shift element D is arranged axially between the third planetary gear set P3 and the fifth shift element E. The fourth shift element D and the fifth shift element E are combined to form a shift element pair SP3, in that fourth shift element D and the fifth shift element E are provided axially directly next to each other and radially essentially at the same level and include a common actuating element, via which the fourth shift element D, on the one hand, and the fifth shift element E, on the other hand, can be actuated from a neutral position.

Figure 3:
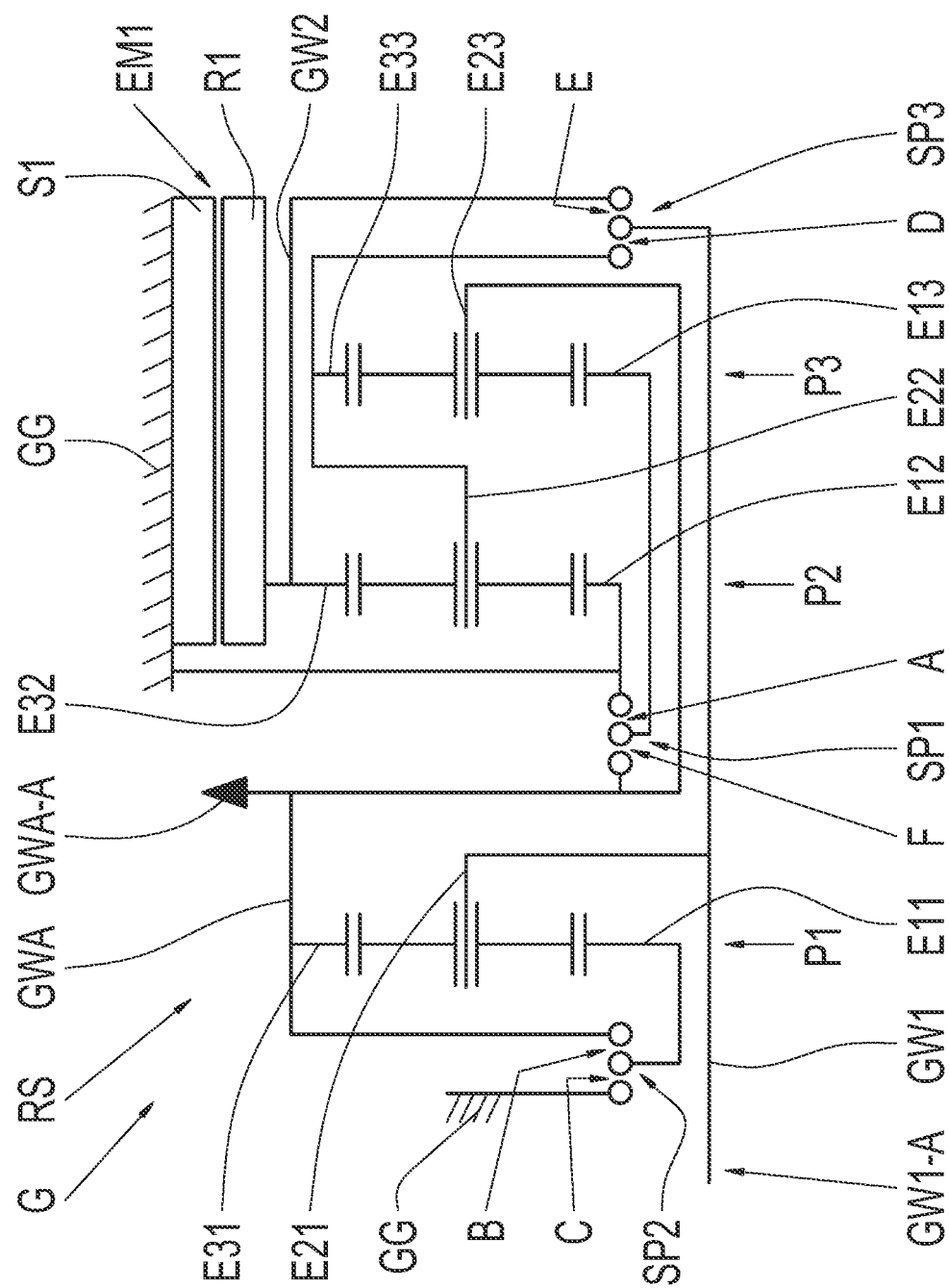

Moreover, FIG. 3 shows a diagrammatic view of a transmission G according to a second example design option of the invention, which can also be utilized in the motor vehicle drive train in FIG. 1. This example design option largely corresponds to the preceding example variant according to FIG. 2, with the difference that a second shift element B, upon actuation, now rotationally fixes the first element E11 of the first planetary gear set P1 to the output shaft GWA and, thereby, also to the third element E31 of the first planetary gear set P1, which results in an interlock of the first planetary gear set P1. Once again, the second shift element B is combined with the third shift element C to form a shift element pair SP2, wherein the shift elements B and C have now axially interchanged the positions as compared to the example variant according to FIG. 2, however, in that the second shift element B is now situated axially between the third shift element C and the first planetary gear set P1. Otherwise, the example design option according to FIG. 3 corresponds to the example variant according to FIG. 2, and therefore reference is made to the description thereof.

Figure 4:
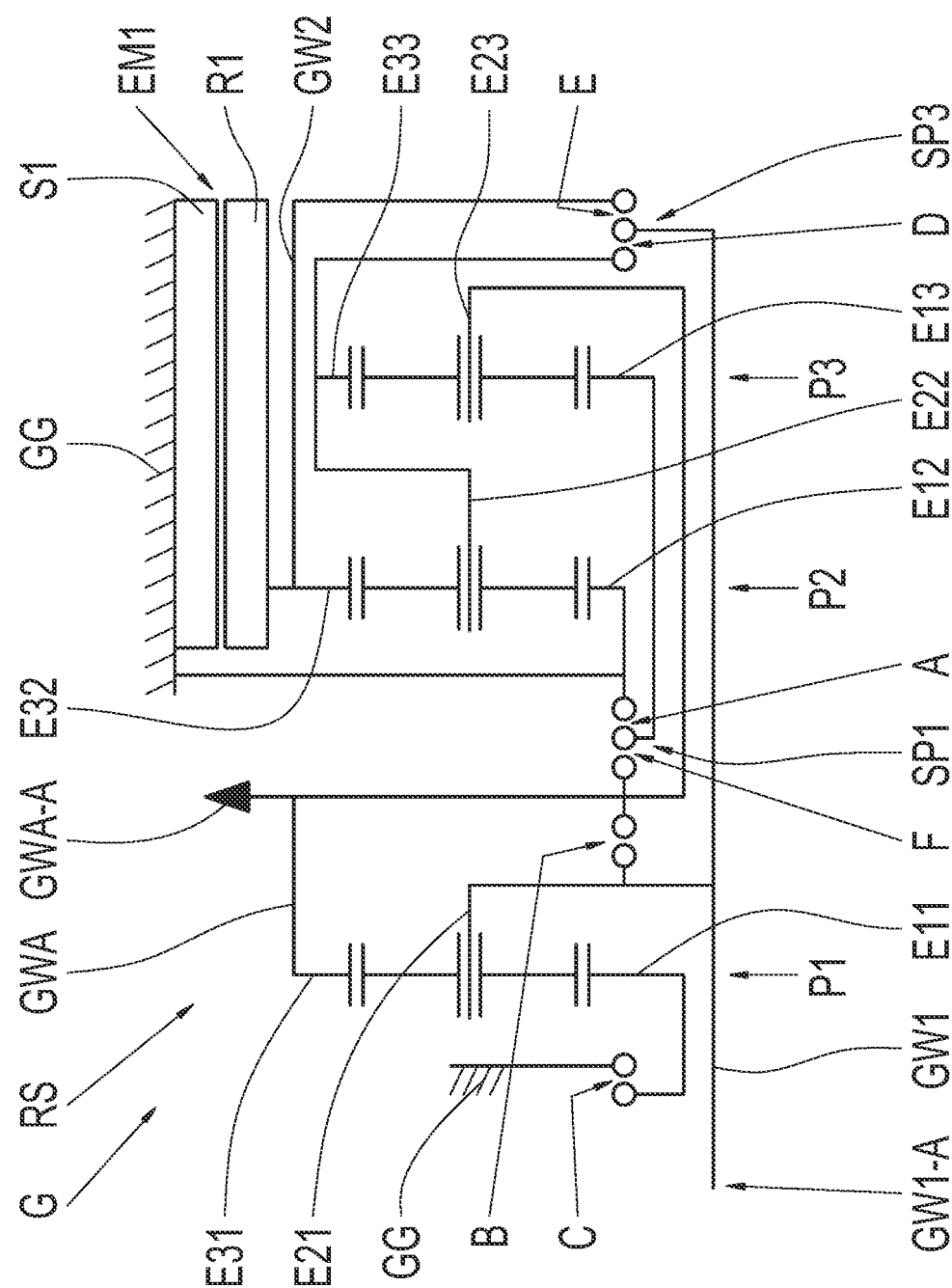

FIG. 4 shows a schematic of a transmission G according to a third example embodiment of the invention, of the type which can also be utilized in the motor vehicle drive train from FIG. 1. This example embodiment also essentially corresponds to the example variant according to FIG. 2, wherein, in contrast thereto, a second shift element B, upon actuation, now rotationally fixes the first element E11 of the first planetary gear set P1 to the output shaft GWA and, thereby, also to the third element E31 of the first planetary gear set P1. This results in an interlock of the first planetary gear set P1. In addition, the second shift element B and the third shift element C are now no longer combined to form a shift element pair, but rather are present as single shift elements. While the third shift element C is provided axially between the first planetary gear set P1 and the mounting interface GW1-A of the first input shaft GW1, the second shift element B is located axially between the first planetary gear set P1 and the second planetary gear set P2, wherein, specifically, the second shift element B is provided axially between the first planetary gear set P1 and the mounting interface GWA-A of the output shaft GWA. For the rest, the example embodiment according to FIG. 4 corresponds to the example variant according to FIG. 2, and therefore reference is made to the description thereof.

Figure 5:
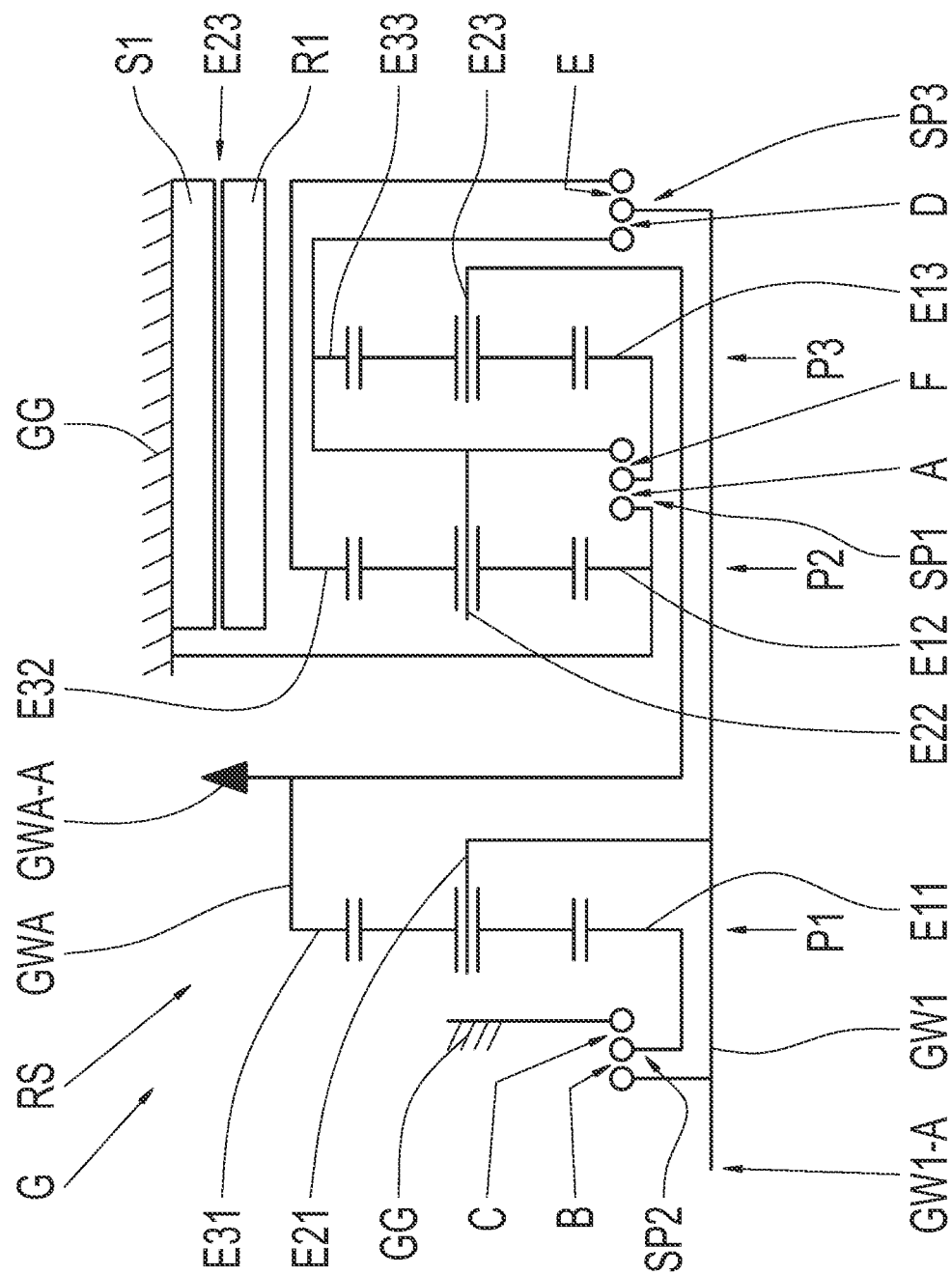

FIG. 5 shows a diagrammatic view of a transmission G according to a fourth example design option of the invention, which can also be utilized in the motor vehicle drive train from FIG. 1. This example design option largely corresponds to the example variant according to FIG. 2, with the difference that a sixth shift element F, upon actuation, now rotationally fixes the first element E13 of the third planetary gear set P3 to the second element E22 of the second planetary gear set P2 and the third element E33 of the third planetary gear set P3. Therefore, an engagement of the sixth shift element F results in an interlock of the third planetary gear set P3. The sixth shift element F is combined with the first shift element A to form a shift element pair SP1, wherein the first shift element A and the sixth shift element F, in this case, are provided axially between the second planetary gear set P2 and the third planetary gear set P3, however. The first shift element A is situated axially between the second planetary gear set P2 and the sixth shift element F. Otherwise, the example design option according to FIG. 5 corresponds to the example embodiment according to FIG. 2, and therefore reference is made to the description thereof.

Figure 6:
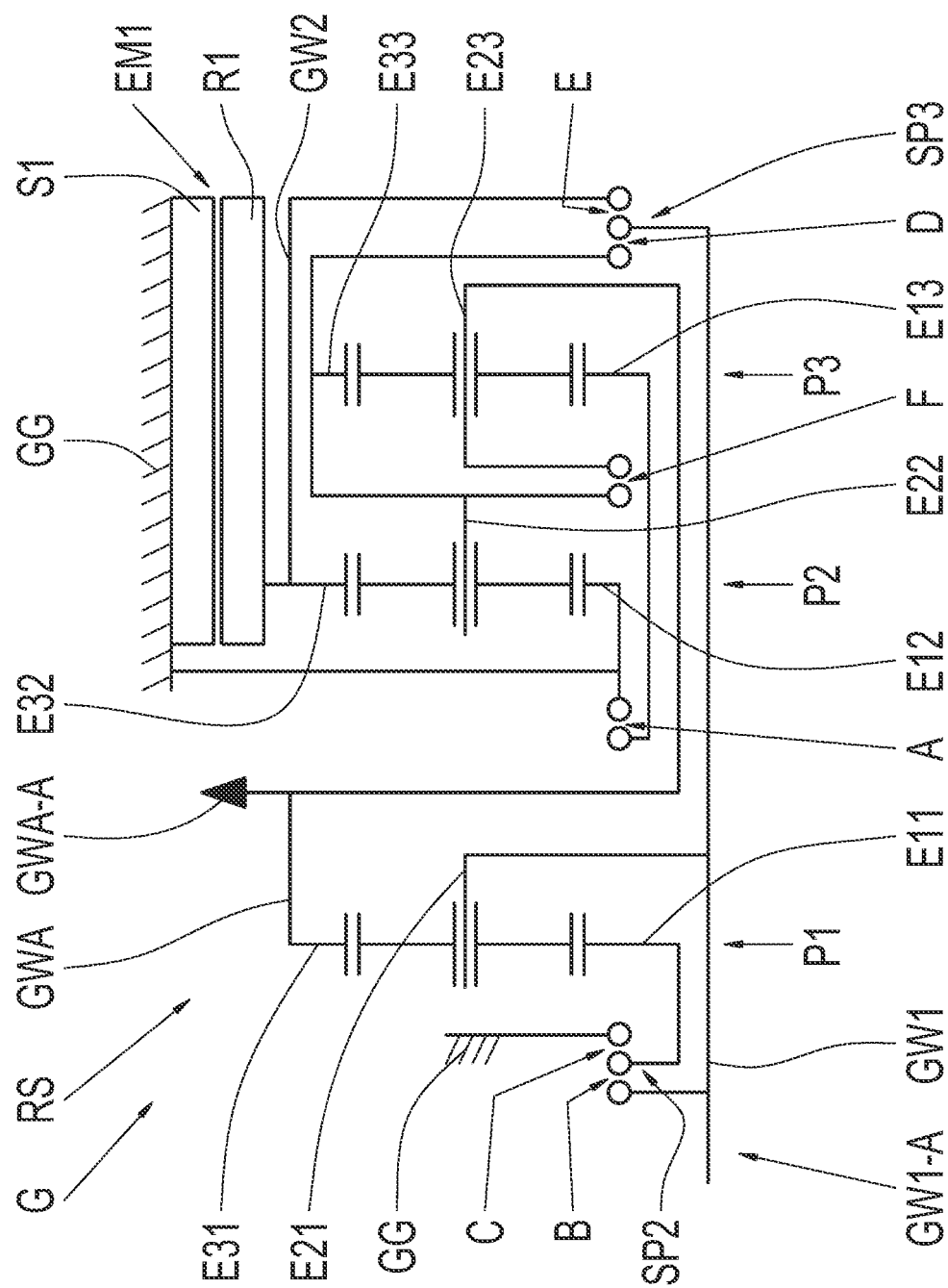

FIG. 6 shows a schematic of a transmission G according to a fifth example embodiment of the invention, wherein this example embodiment can also be utilized in the motor vehicle drive train from FIG. 1. This example embodiment also essentially corresponds to the example variant according to FIG. 2, wherein, in contrast thereto, a sixth shift element F, upon actuation, now rotationally fixes the output shaft GWA to the second element E22 of the second planetary gear set P2 and the third element E33 of the third planetary gear set P3. Since this also brings about a rotationally fixed connection between the second element E23 of the third planetary gear set P3 and the third element E33 of the third planetary gear set P3, this results in an interlock of the third planetary gear set P3. Moreover, the first shift element A and the sixth shift element F are no longer combined to form a shift element pair, since the first shift element A is still located axially between the mounting interface GWA-A of the output shaft GWA and the second planetary gear set P2, while the sixth shift element F is now arranged axially between the second planetary gear set P2 and the third planetary gear set P3. For the rest, the example embodiment according to FIG. 6 corresponds to the example variant according to FIG. 2, and therefore reference is made to the description thereof.

Figure 7:
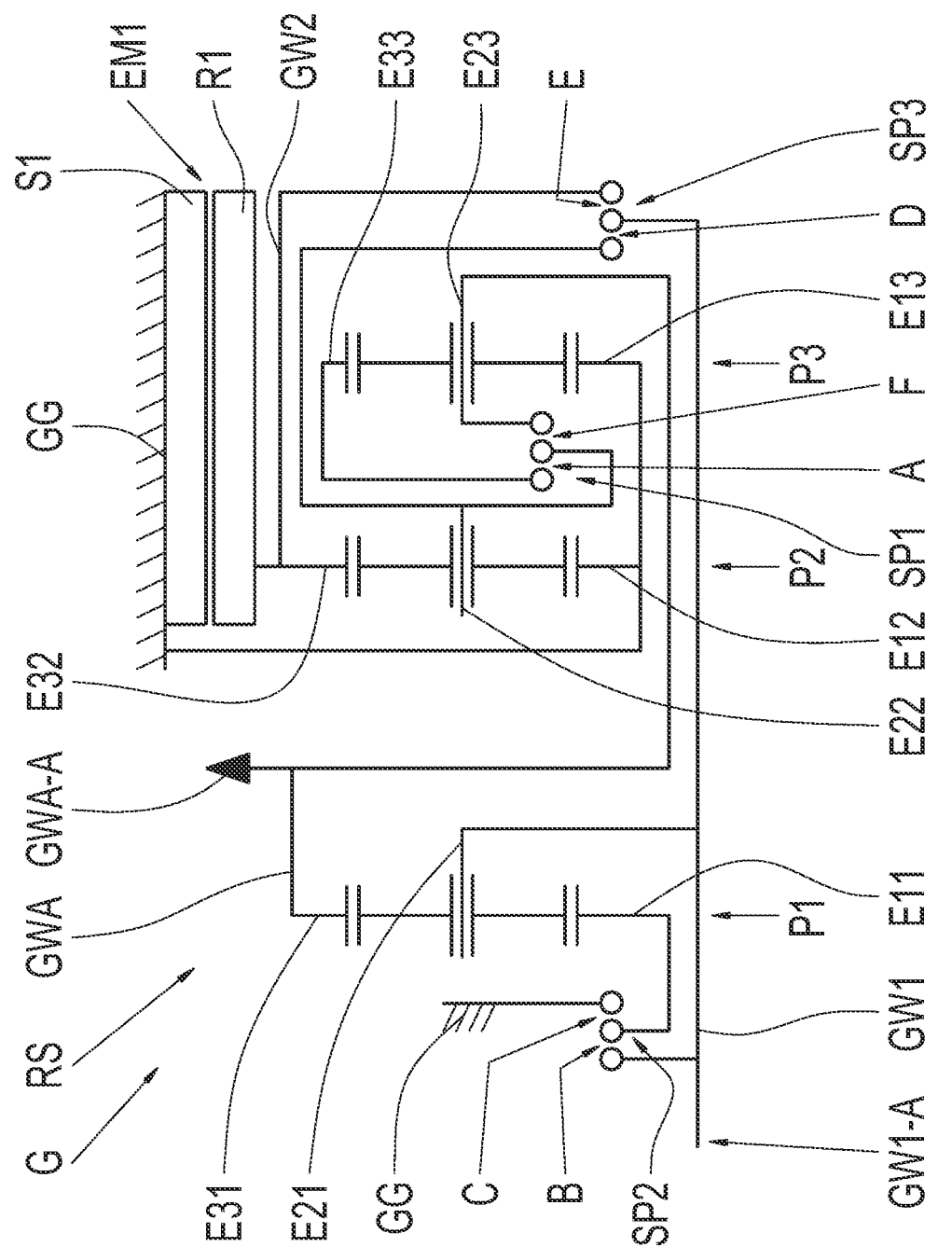

Moreover, FIG. 7 shows a schematic of a transmission G according to a sixth example design option of the invention, which can also be utilized in the motor vehicle drive train from FIG. 1. This example design option essentially corresponds to the preceding example variant according to FIG. 6, wherein, in contrast thereto, the first element E13 of the third planetary gear set P3 is now rotationally fixed to the first element E12 of the second planetary gear set P2 and is permanently fixed jointly therewith. Moreover, the third element E33 of the third planetary gear set P3 is now not permanently rotationally fixed to the second element E22 of the second planetary gear set P2, but rather is connected thereto in a rotationally fixe manner only by engaging a first shift element A. The first shift element A is arranged jointly with the sixth shift element F axially between the second planetary gear set P2 and the third planetary gear set P3, wherein the sixth shift element F, upon actuation, connects the second element E22 of the second planetary gear set P2 and the output shaft GWA to each other in a rotationally fixed manner. The first shift element A is also combined with the sixth shift element F to form a shift element pair SP1 and, specifically, is situated axially between the second planetary gear set P2 and the sixth shift element F. For the rest, the example design option according to FIG. 7 corresponds to the example variant according to FIG. 6, and therefore reference is made to the description thereof.

Figure 8:
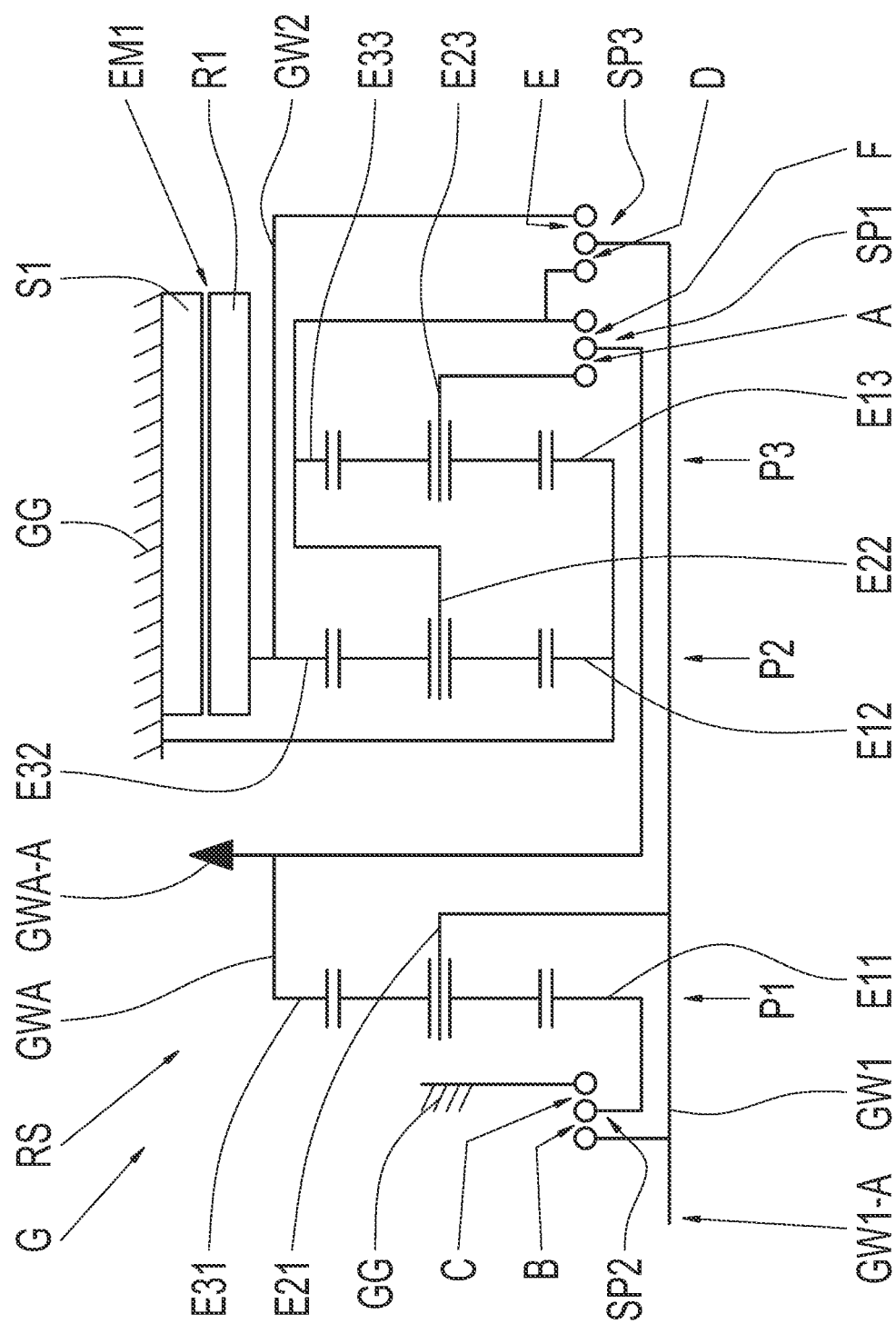

Moreover, FIG. 8 shows a diagrammatic view of a transmission G according to a seventh example embodiment of the invention. This example embodiment can be utilized in the motor vehicle drive train from FIG. 1 and largely corresponds to the example variant according to FIG. 6. The difference in this case is that the first element E13 of the third planetary gear set P3 is permanently fixed, jointly with the first element E12 of the second planetary gear set P2, at the rotationally fixed component GG, while the second element E23 of the third planetary gear set P3 is now no longer permanently rotationally fixed to the output shaft GWA. Rather, a rotationally fixed connection is established between the output shaft GWA and the second element E23 of the third planetary gear set P3 only by engaging a first shift element A. The first shift element A and the sixth shift element F, via which, upon actuation, a rotationally fixed connection is established between the second element E22 of the second planetary gear set P2 and the output shaft GWA, are combined to form a shift element pair SP1 and are provided axially on a side of the third planetary gear set P3 facing away from the second planetary gear set P2. Specifically, the first shift element A is situated axially adjacent to the third planetary gear set P3, wherein the first shift element A and the sixth shift element F are jointly arranged axially between the third planetary gear set P3, on the one side, and the fourth shift element D and the fifth shift element E on the other side. Otherwise, the example embodiment according to FIG. 8 corresponds to the example variant according to FIG. 6, and therefore reference is made to the description thereof.

Figure 9:
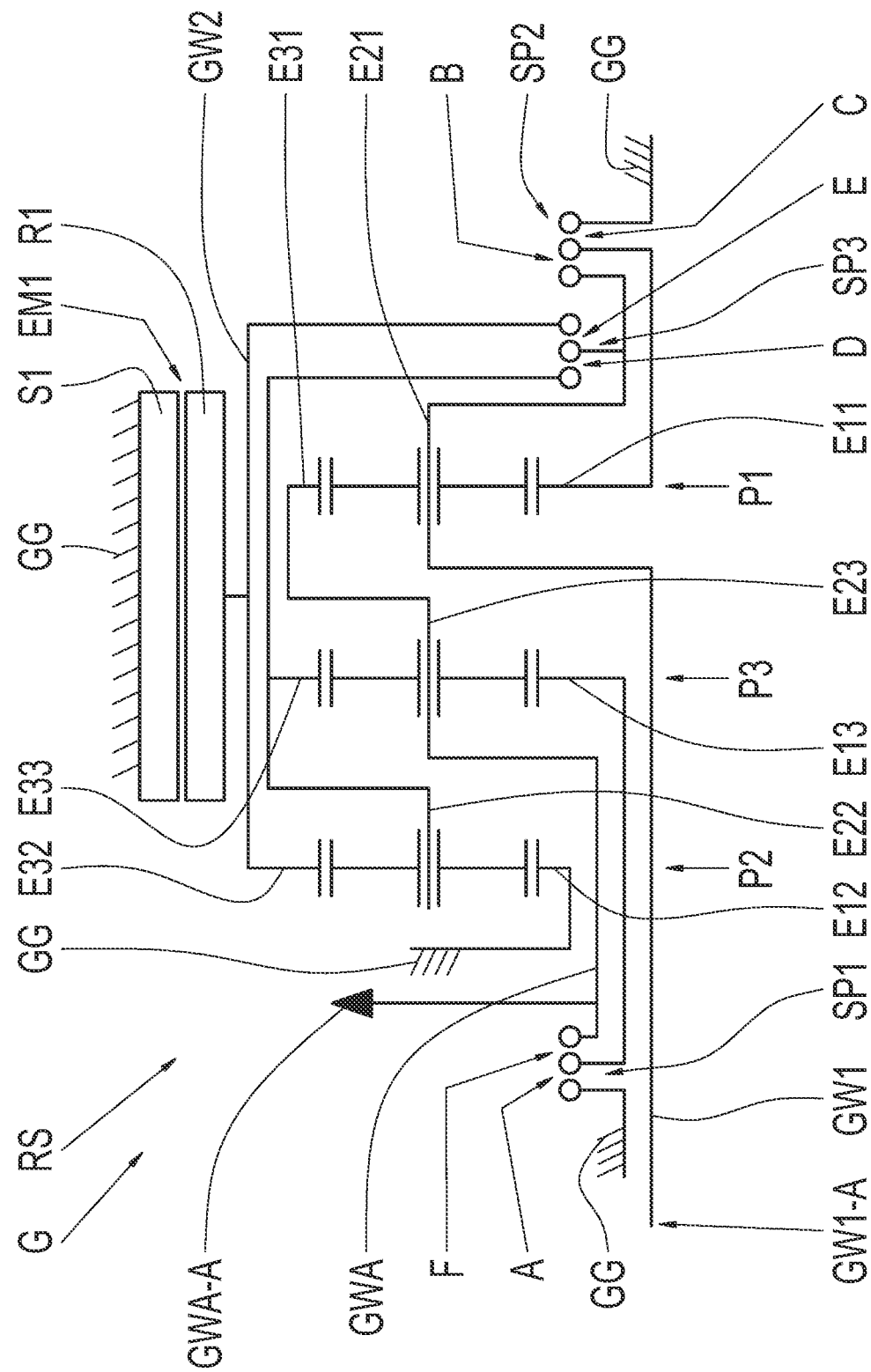

FIG. 9 shows a schematic of a transmission G according to an eighth example design option of the invention, which can also be utilized in the motor vehicle drive train from FIG. 1. This example design option essentially corresponds to the example variant according to FIG. 2, with the difference that the planetary gear sets P1, P2, and P3 are now axially arranged in a changed sequence. Thus, the mounting interface GW1-A of the first input shaft GW1 is initially followed by the second planetary gear set P2, then the third planetary gear set P3, and, finally, the first planetary gear set P1. In addition, the shift elements A and F combined to form the shift element pair SP1 are provided axially between the mounting interface GW1-A of the first input shaft GW1 and the second planetary gear set P2, wherein, specifically, the shift elements A and F are situated axially between the mounting interface GW1-A of the first input shaft GW1 and the mounting interface GWA-A of the output shaft GWA. The remaining shift elements B, C, D, and E are located axially on a side of the first planetary gear set P1 facing away from the third planetary gear set P3, wherein the fourth shift element D is situated axially adjacent to the first planetary gear set P1, followed, axially, initially by the fifth shift element E, then the second shift element B, and, finally, the third shift element C. Once again, the second shift element B and the third shift element C are combined to form a shift element pair SP2, and the fourth shift element D and the fifth shift element E are combined to form a shift element pair SP3. The electric machine EM1 is arranged axially at the level of the third planetary gear set P3 and of the first planetary gear set P1 and radially surrounding these Otherwise, the example embodiment according to FIG. 9 corresponds to the example variant according to FIG. 2, and therefore reference is made to the description thereof.

Figure 10:
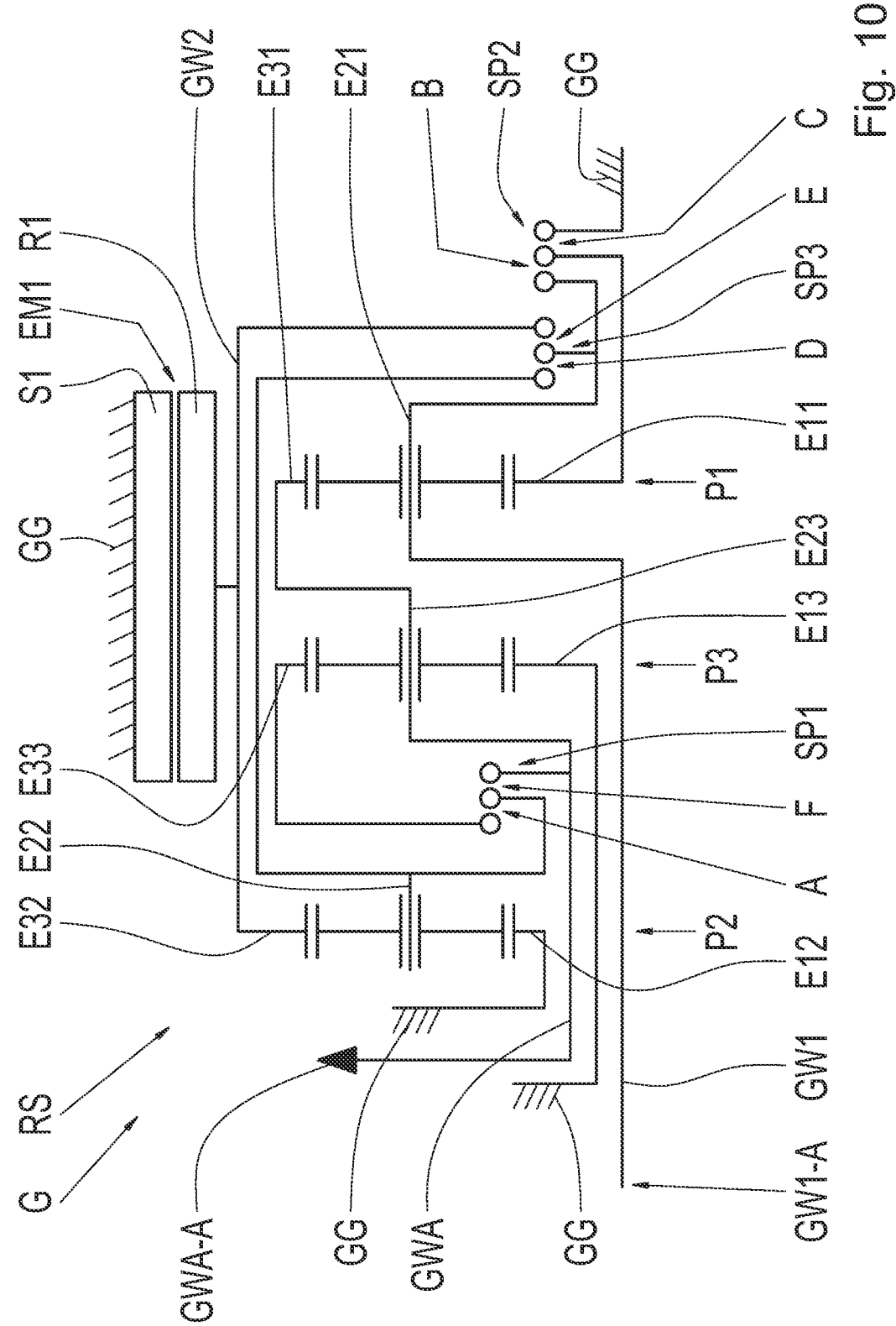

FIG. 10 shows a diagrammatic view of a transmission G according to a ninth example design option of the invention. This example design option can also be utilized in the motor vehicle drive train in FIG. 1 and largely corresponds to the example variant according to FIG. 7. The difference in this case is that the planetary gear sets P1, P2, and P3, as in the preceding variant according to FIG. 9, are arranged axially in the sequence second planetary gear set P2, third planetary gear set P3, and, finally, first planetary gear set P1 subsequent to the mounting interface GW1-A of the first input shaft GW1. While the shift elements A and F combined to form the shift element pair SP1 are arranged axially between the second planetary gear set P2 and the third planetary gear set P3, the remaining shift elements B, C, D, and E are situated axially on a side of the first planetary gear set P1 facing away from the third planetary gear set P3. In this case, the fourth shift element D is provided axially adjacent to the first planetary gear set P1, wherein, positioned axially subsequent thereto, are, initially, the fifth shift element E, then the second shift element B, and, finally, the third shift element C. As in the variant according to FIG. 9, the fourth shift element D and the fifth shift element E are combined to form the shift element pair SP3, and the second shift element B and the third shift element C are combined to form the shift element pair SP2. Likewise, the electric machine EM1 is also arranged axially at the level of the third planetary gear set P3 and of the first planetary gear set P1 and radially surrounding these For the rest, the example embodiment according to FIG. 10 corresponds to the example variant according to FIG. 7, and therefore reference is made to the description thereof.

Figure 11:
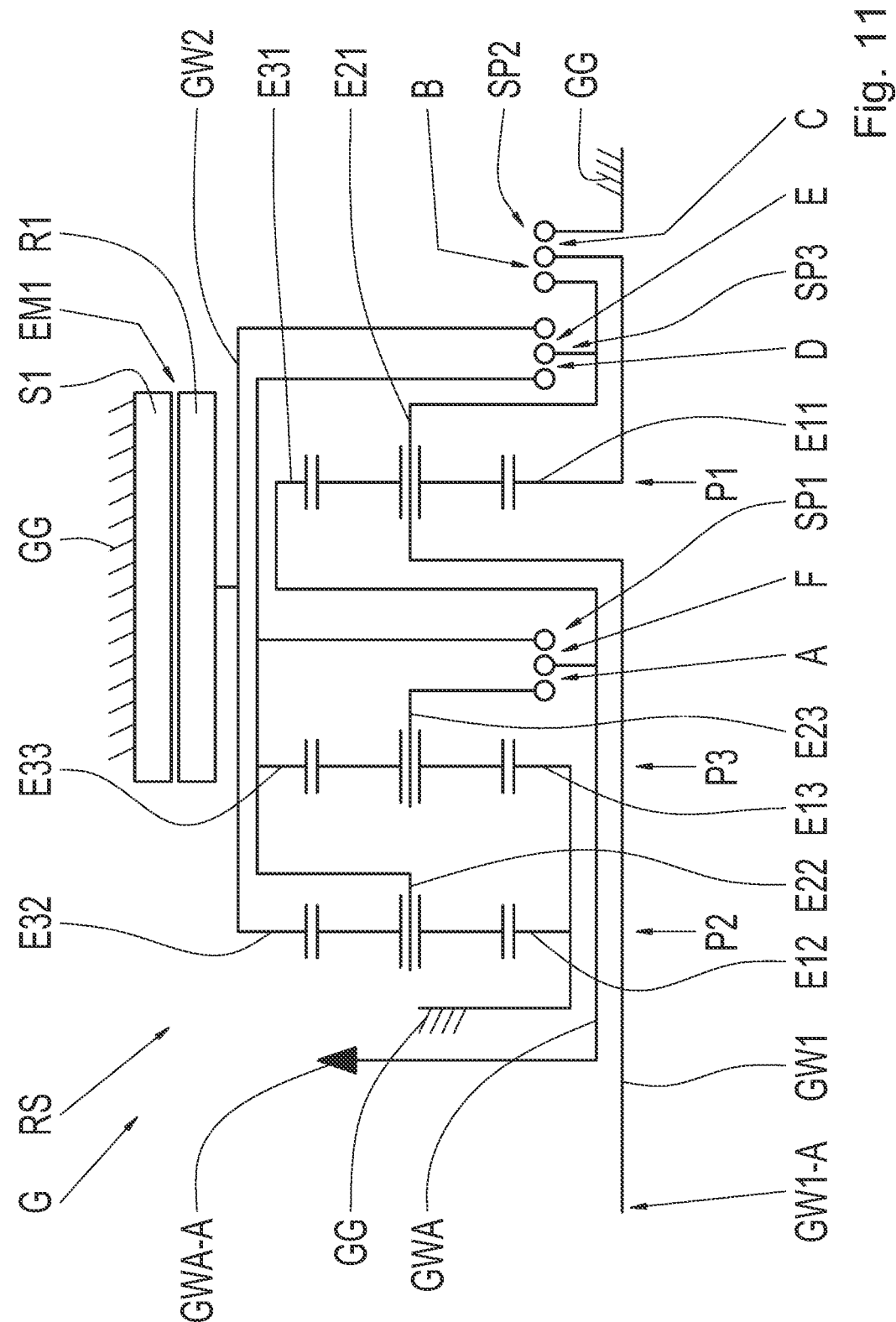

Moreover, FIG. 11 shows a schematic of a transmission G according to a tenth example embodiment of the invention, of the type which can also be utilized in the motor vehicle drive train in FIG. 1. This example embodiment essentially to the example variant according to FIG. 8, wherein, in contrast thereto, the planetary gear sets P1, P2, and P3, as in the two preceding example variants according to FIGS. 9 and 10, are now axially arranged in a changed sequence. Thus, the mounting interface GW1-A of the first input shaft GW1 is initially followed by the second planetary gear set P2, then the third planetary gear set P3, and, finally, the first planetary gear set P1. While the shift elements A and F combined to form the shift element pair SP1 are situated axially between the third planetary gear set P3 and the first planetary gear set P1, the remaining shift elements B, C, D, and E are located axially on a side of the first planetary gear set P1 facing away from the third planetary gear set P3. In this case, the fourth shift element D is situated axially adjacent to the first planetary gear set P1, wherein, positioned subsequent thereto, are, initially, the fifth shift element E, then the second shift element B, and, finally, the third shift element C. Once again, the fourth shift element D and the fifth shift element E are combined to form the shift element pair SP3, and the second shift element B and the third shift element C are combined to form the shift element pair SP2. The electric machine EM1 is arranged axially largely at the level of the third planetary gear set P3 and of the first planetary gear set P1 and radially surrounding these Otherwise, the example variant according to FIG. 11 corresponds to the example embodiment according to FIG. 8, and therefore reference is made to the description thereof.

Figure 12:
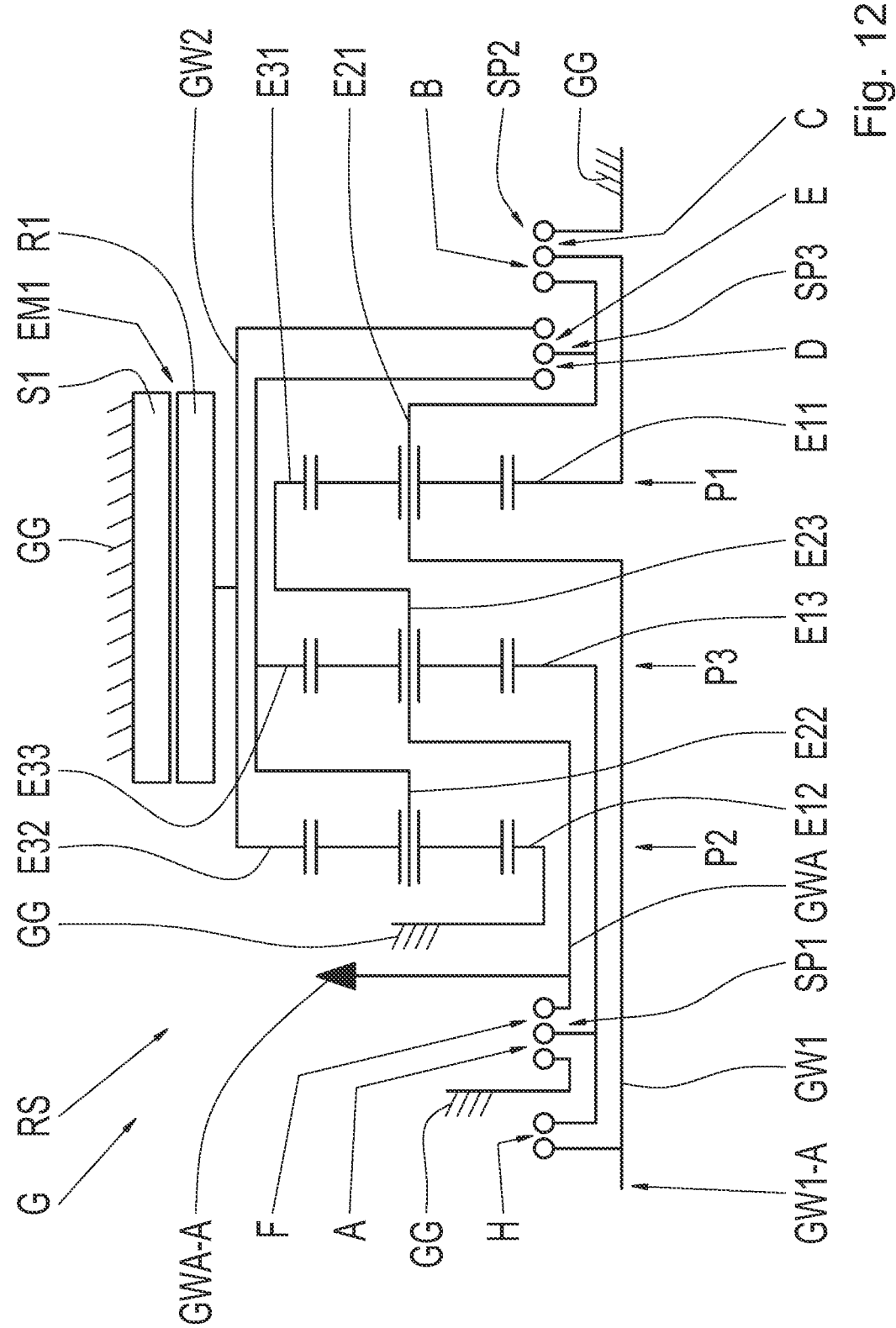

FIG. 12 shows a diagrammatic view of a transmission G according to an eleventh example design option of the invention. This example design option can also be utilized in the motor vehicle drive train in FIG. 1 and essentially corresponds to the example variant according to FIG. 9, wherein, in contrast to the example variant according to FIG. 9, a further shift element H is now additionally provided, which, upon actuation, connects the first input shaft GW1 to the first element E13 of the third planetary gear set P3 in a rotationally fixed manner. This further shift element H, which is also designed as a form-locking shift element, is provided axially between the mounting interface GW1-A of the first input shaft GW1 and the first shift element A. Otherwise, the example design option according to FIG. 12 corresponds to the example variant according to FIG. 9, and therefore reference is made to the description thereof.

FIG. 13 shows an exemplary shift pattern for the transmissions G from FIGS. 2 through 12 in table form. As is apparent, a total of four gears 1 through 4, which differ in terms of the ratio, and one auxiliary gear HZG can be implemented between the first input shaft GW1 and the output shaft GWA, wherein, in the columns of the shift pattern, an X indicates which of the shift elements A through F is engaged in which of the gears 1 through 4 and in the auxiliary gear HZG.

As is apparent in FIG. 13, a first gear 1 is engaged between the first input shaft GW1 and the output shaft GWA by actuating the first shift element A and the fifth shift element E. Moreover, a second gear 2 results between the first input shaft GW1 and the output shaft GWA by engaging the first shift element A and the fourth shift element D. In addition, a third gear can be implemented between the first input shaft GW1 and the output shaft GWA in a first variant 3.1 by actuating the first shift element A and the second shift element B, wherein the third gear can also be implemented in a second variant 3.2 by engaging the second shift element B and the sixth shift element F, in a third variant 3.3 by actuating the fourth shift element D and the sixth shift element F, in a fourth variant 3.4 by engaging the second shift element B and the fourth shift element D, in a fifth variant 3.5 by actuating the second shift element B and the fifth shift element E, and in a sixth variant 3.6 by engaging the second shift element B. While the electric machine EM1 is also integrated in each of the variants 3.1 through 3.5, and so travel can take place in a hybrid manner while simultaneously utilizing the internal combustion engine VKM and the electric machine EM1, the electric machine EM1 is decoupled in the case of the sixth variant 3.6. The latter has the advantage that the electric machine EM1 does not need to be engaged during operation.

In addition, a fourth gear results between the first input shaft GW1 and the output shaft GWA in a first variant 4.1 by actuating the first shift element A and the third shift element C, wherein the fourth gear can also be engaged in a second variant 4.2 by engaging the third shift element C and the sixth shift element F, in a third variant 4.3 by actuating the third shift element C and the fourth shift element D, in a fourth variant 4.4 by engaging the third shift element C and the fifth shift element E, and in a fifth variant 4.5 by actuating the third shift element C. In the final, fifth variant 4.5, the electric machine EM1 is decoupled, and so travel can take place purely via the upstream internal combustion engine VKM. By comparison, in the variants 4.1 through 4.4, travel takes place in a hybrid manner with simultaneous utilization of the internal combustion engine VKM and the electric machine EM1. Finally, the auxiliary gear HZG results by engaging the fifth shift element E and the sixth shift element F.

Although the shift elements A through F are each designed as form-fit shift elements, a power shift can be implemented between the first gear 1 and the second gear 2, between the second gear 2 and the first variant 3.1 of the third gear, and between the first variant 3.1 of the third gear and the first variant 4.1 of the fourth gear. The reason therefor is that the first shift element A contributes to all these gears. A synchronization during the gear shifts can take place in each case via an appropriate closed-loop control of the upstream internal combustion engine VKM, and therefore the particular shift element to be disengaged is disengaged without load and the shift element to be subsequently engaged can be engaged without load.

The transmissions G from FIGS. 2 through 12 can also be operated in alternative operating modes with the aid of the electric machine EM1. Purely electric driving can take place in a first gear E1, which is effective between the second input shaft GW2 and the output shaft GWA and, for the implementation of which, the first shift element A is to be transferred into an engaged condition. As a result, when the first shift element A is engaged, the electric machine EM1 is coupled to the output shaft GWA via the second planetary gear set P2 and the third planetary gear set P3, wherein the ratio of the first gear E1 corresponds to a ratio of the first gear 1 between the first input shaft GW1 and the output shaft GWA.

In addition, a second gear E2 can also be implemented between the second input shaft GW2 and the output shaft GWA, for the implementation of which the sixth shift element F is to be engaged. As a result, the output shaft GWA is then coupled via the second planetary gear set P2 to the second input shaft GW2 and, thereby, also to the rotor R1 of the electric machine EM1. A ratio of this second gear E2 corresponds to a ratio of the auxiliary gear HZG, which is effective between the first input shaft GW1 and the output shaft GWA.

Advantageously, starting from the first gear E1, a start of the internal combustion engine VKM can take place into the first gear 1, into the second gear 2, into the first variant 3.1 of the third gear, or into the first variant 4.1 of the fourth gear, since the first shift element A is also engaged in each of these gears. The same is possible from the second gear E2 into the gears 3.2, 3.3, 4.2, and HZG, since the sixth shift element F also contributes to each of these. Therefore, a transition from purely electric driving into driving via the internal combustion engine or into hybrid driving can be carried out rapidly.

Moreover, a charging or starting function can be implemented by engaging the fourth shift element D. This is the case because, in the engaged condition of the fourth shift element D, the second input shaft GW2 is coupled via the second planetary gear set P2 to the first input shaft GW1 and, thereby, also to the internal combustion engine VKM. Simultaneously, there is no force-fit connection to the output shaft GWA, however, wherein the second input shaft GW2 rotates faster than the first input shaft GW1 in this case. When the electric machine EM1 is operated as a generator, an electric accumulator can be charged via the internal combustion engine VKM, whereas, when the electric machine EM1 is operated as an electric motor, a start of the internal combustion engine VKM is implementable via the electric machine EM1.

Alternatively, however, a charging or starting function can also be implemented by engaging the fifth shift element, wherein, in this case, the first input shaft GW1 and the second input shaft GW2 are then directly connected to each other in a rotationally fixed manner, and so the rotor R1 of the electric machine EM1 is also directly connected to the first input shaft GW1 in a rotationally fixed manner. In this case, the electric machine EM1 can be operated as a generator or as an electric motor.

In addition, a rotational-speed reduction of the electric machine EM1 can be configured in the mechanical or hybrid mode. After a gear shift from the third gear into the fourth gear, with torque support via the electric machine EM1, or after a start of the internal combustion engine VKM into the fourth gear, hybrid driving in the first variant 4.1 of the fourth gear results. In order to reduce the rotational speed of the electric machine EM in the fourth gear at higher ground speeds, a change-over can be carried out from the first variant 4.1 of the fourth gear into the second variant 4.2, in which the rotor R1 has a lower rotational speed. This change-over takes place while obtaining the tractive force via the internal combustion engine VKM with the third shift element C engaged. For this purpose, the first shift element A, which is then load-free, is disengaged and the likewise load-free, sixth shift element F is engaged, wherein the rotational-speed adaptation takes place in each case via closed-loop control of the rotational speed of the electric machine EM.

The change-over into the second variant 4.2 also has the advantage that the internal combustion engine VKM can be decoupled at any time by disengaging the third shift element C also in the absence of an additional separating clutch, while the electric machine EM1 drives or decelerates the vehicle. Moreover, in the case of a vehicle that is slowing down, a downshift from the fourth gear into the third gear can be prepared, in that, initially, a change-over takes place from the second variant 4.2 into the first variant 4.1, while the internal combustion engine VKM maintains the tractive force with the third shift element C engaged. In the first variant 4.1 of the fourth gear, the first shift element A is engaged, which becomes necessary in order to support the tractive force via the electric machine EM1 during the downshift from the fourth gear into the third gear. Alternatively, a downshift can also be implemented from the second variant 4.2 of the fourth gear into the second variant 3.2 of the third gear, however, since the sixth shift element F contributes to both of these.

In addition, an electrodynamic starting function can be implemented with the transmission G from FIG. 12. For this purpose, the further shift element H is to be engaged, wherein, in this case, the upstream internal combustion engine VKM is then connected to the first element E13 of the third planetary gear set P3, while the electric machine EM1 is connected via the constant ratio of the second planetary gear set to the third element E33 of the third planetary gear set P3 and the output shaft GWA is connected to the second element E23 of the third planetary gear set P3. A ratio results for the internal combustion engine VKM that is higher than the ratio of the first gear 1.

Figure 14:
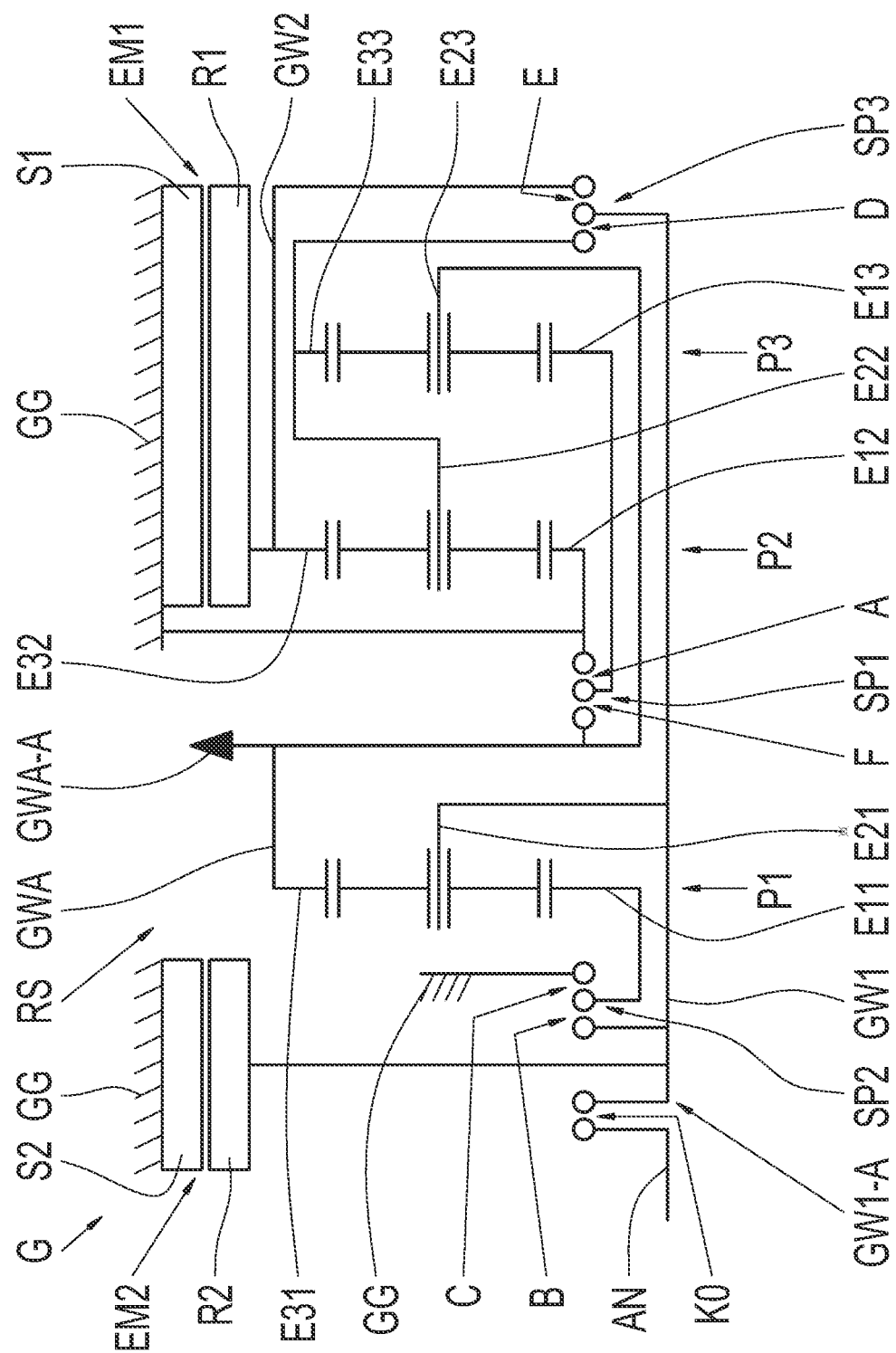
FIGS. 14 and 15 each show a diagrammatic view of a transmission of the type that can also be utilized in the motor vehicle drive train from FIG. 1.

Moreover, FIG. 14 shows a schematic of a transmission G according to a twelfth example embodiment of the invention, of the type which can also be utilized in the motor vehicle drive train in FIG. 1. This example embodiment essentially corresponds to the example variant according to FIG. 2, wherein, in contrast thereto, the first input shaft GW1 can now be rotationally fixed, at the mounting interface GW1-A via a seventh shift element K0, to a connection shaft AN, which is then connected to the upstream internal combustion engine VKM in the motor vehicle drive train. The seventh shift element K0 is configured as a form-locking shift element and, particularly preferably, is present as a constant-mesh shift element. Moreover, a further electric machine EM2 is also provided, the rotor R2 of which is rotationally fixed to the first input shaft GW1, while a stator S2 of the further electric machine EM2 is fixed at the rotationally fixed component GG. The rotor R2 is connected at the first input shaft GW1 axially between the seventh shift element K0 and the second shift element B. For the rest, the example variant according to FIG. 14 corresponds to the example design option according to FIG. 2, and therefore reference is made to the description thereof.

Figure 15:
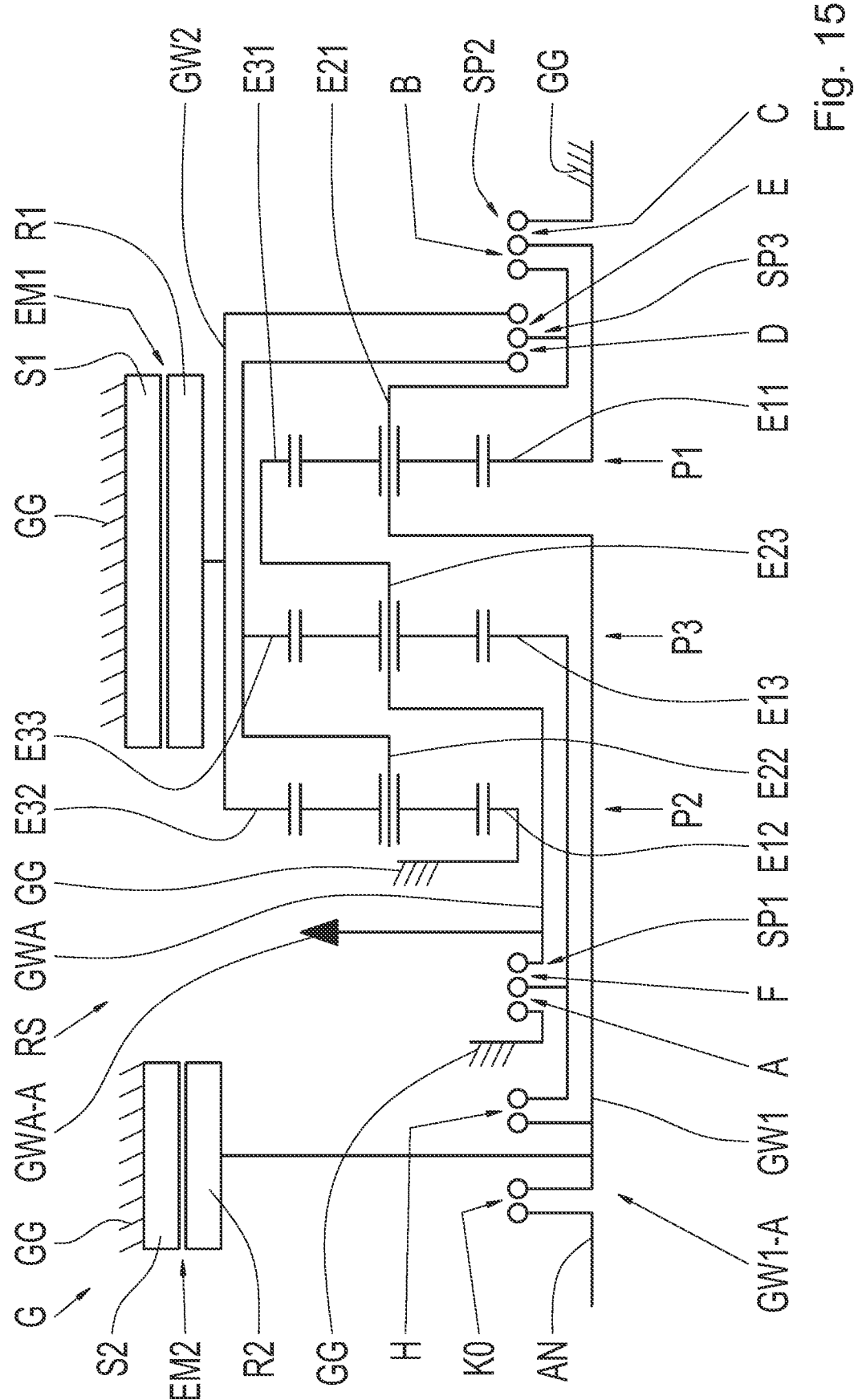

FIG. 15 shows a diagrammatic view of a transmission G according to a thirteenth example design option of the invention. This example design option can also be utilized in the motor vehicle drive train from FIG. 1, wherein the example design option largely corresponds to the example variant from FIG. 12. The difference now, however, is that the first input shaft GW1 can be connected, at the mounting interface GW1-A, as is also the case in the preceding example variant according to FIG. 14, via a seventh shift element K0 in a rotationally fixed manner to a connection shaft AN, which is then connected to the upstream internal combustion engine VKM in the motor vehicle drive train. In this case, the seventh shift element K0 is designed as a form-locking shift element and, in this case, preferably as a constant-mesh shift element. In addition, a further electric machine EM2 is also provided, the rotor R2 of which is rotationally fixed to the first input shaft, while a stator S2 of the further electric machine EM2 is fixed at the rotationally fixed component GG. A connection of the rotor R2 of the further electric machine EM2 at the first input shaft GW1 is implemented axially between the seventh shift element K0 and the further shift element H. Otherwise, the example variant according to FIG. 15 corresponds to the example embodiment according to FIG. 12, and therefore reference is made to the description thereof.

In FIG. 16, different conditions I through XXX of the motor vehicle drive train from FIG. 1, with utilization of the transmission G from FIG. 14 or 15, are represented in table form, wherein these different conditions I through XXX are achieved via different integrations of the two electric machines EM1 and EM2 and the internal combustion engine VKM. Overall, thirty different conditions I through XXX can be represented. In the subsequent columns, it is indicated which of the gears with respect to the electric machine EM1, with respect to the further electric machine EM2, and also with respect to the internal combustion engine VKM are selected in the transmission G, wherein 0 means that no connection and/or no independent connection of the particular electric machine EM1 and/or EM2 and/or of the internal combustion engine VKM to the output shaft GWA has been established.

In a first condition I, purely electric driving takes place via the electric machine EM1, in that, in the transmission G, the first gear E1 is selected in the way described above with respect to FIG. 13. In the condition II as well, travel takes place solely via the electric machine EM1, wherein, for this purpose, the second gear E2 is selected in the transmission G, which results via the sole actuation of the sixth shift element F. By comparison, in the condition III, operation takes place via the further electric machine EM2, in that the sixth variant 3.6 of the third gear is selected in the transmission G in the way described with respect to FIG. 13. Likewise, in the condition IV, travel takes place solely via the further electric machine EM2, wherein, for this purpose, the fifth variant 4.5 of the fourth gear is selected in the transmission G by engaging the third shift element C. In the conditions I through IV, travel can take place in a particularly effective manner, since, in the case of a low load request, travel takes place via only one of the two electric machines EM1 or EM2.

Starting at the condition V through the condition XVI, travel takes place via the electric machine EM1 as well as the further electric machine EM2, in that both electric machines EM1 and EM2 are jointly incorporated via the selection of the appropriate gears in the transmission G. Thus, in the condition V, the first gear E1 and the first gear 1 are selected; in the condition VI, the first gear E1 and the second gear 2 are selected; in the condition VII, the first gear E1 and the first variant 3.1 of the third gear are selected; in the condition VIII, the second gear E2 and the second variant 3.2 of the third gear are selected; in the condition IX, the second gear E2 and the third variant 3.3 of the third gear are selected; in the condition X, the fourth variant 3.4 of the third gear is selected; in the condition XI, the fifth variant 3.5 of the third gear is selected; in the condition XII, the first gear E1 and the first variant 4.1 of the fourth gear are selected; in the condition XIII, the second gear E2 and the second variant 4.2 of the fourth gear are selected; in the condition XIV, the third variant 4.3 of the fourth gear is selected; in the condition XV, the fourth variant 4.4 of the fourth gear is selected; and, in the condition XVI, the second gear E2 and the auxiliary gear EZG are selected. In the conditions X, XI, XIV, and XV, the electric machine EM1 is not independently coupled to the output shaft GWA, but rather to the first input shaft GW1 via the fourth shift element D and/or the fifth shift element E, and so the electric machine EM1 can support a drive motion.

In the conditions XVII through XXX, travel then takes place in a hybrid manner by utilizing both electric machines EM1 and EM2 as well as the internal combustion engine VKM, in that the latter is engaged by engaging the fifth shift element K0 in each case. A synchronization of the fifth shift element K0 is implemented, in particular, via the further electric machine EM2. With regard to the selection of the gears, the conditions XVII through XXIII, XXV through XXVIII and XXX correspond to the conditions V through XVI, with the difference that now the fifth shift element K0 is to be engaged in each case. The representation of the individual gears is shown in the columns for the individual shift elements A, B, C, D, E, and F and is specifically described with reference to FIG. 13. In the conditions XXIV and XXIX, however, the electric machine EM1 is decoupled.

In the transmission G according to FIG. 15, in addition, a power shiftability of the electric gears E1 and E2 can also be implemented via the further shift element H, with the advantage that the electric machine EM1 also contributes the largest portion of the drive power during the gear shifts and the further electric machine EM2 can therefore be made considerably smaller. In addition to the electrodynamic starting operation described with respect to FIG. 12, a purely electric starting operation can also be made possible with the transmission according to FIG. 15, wherein the seventh shift element K0 must be in a disengaged condition and the further shift element H is engaged. This has the advantage that travel can also take place for a longer time with high torque and very low ground speeds, without the electric machines or an inverter overheating, since both electric machines EM1 and EM2 can be operated at suitable rotational speeds.

Figure 17:
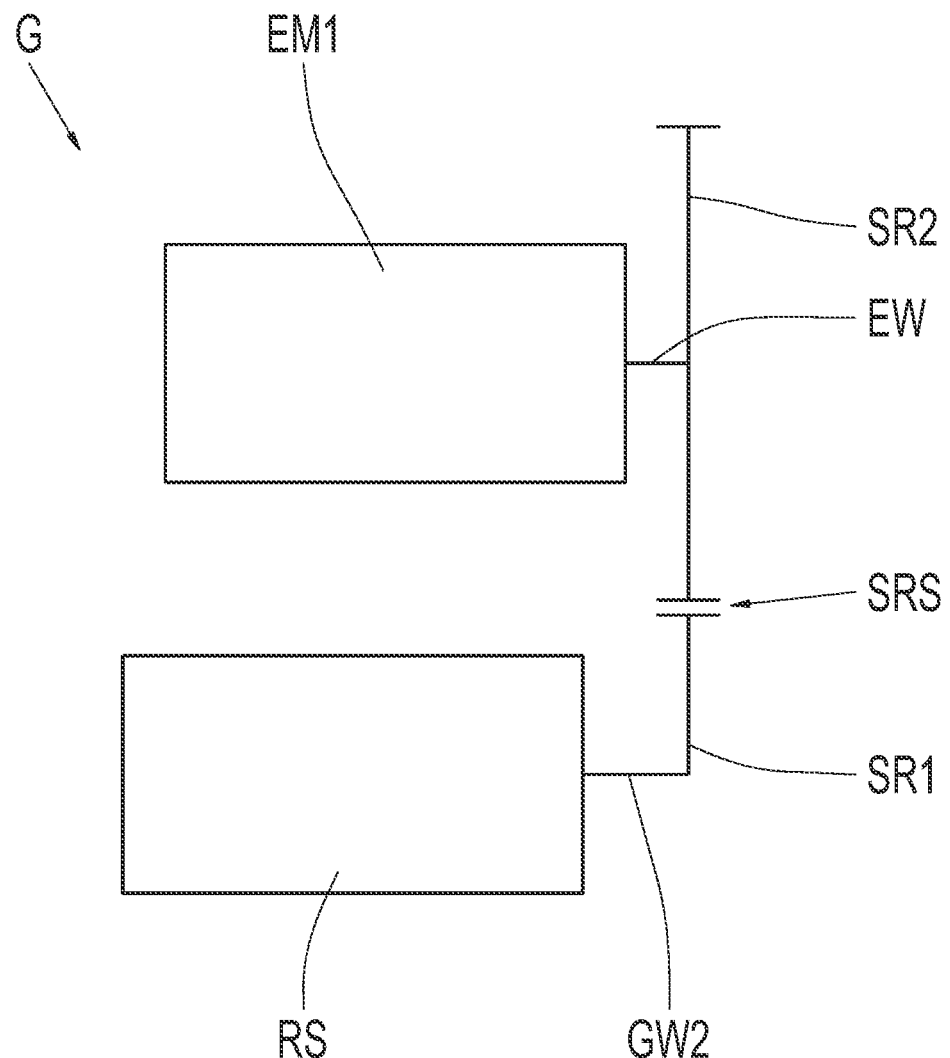
FIGS. 17 through 22 each show a schematic of a modification of the transmissions from FIGS. 2 through 12 as well as 14 and 15.

Finally, FIGS. 17 through 22 show example modifications of the transmissions G from FIGS. 2 through 12 as well as 14 and 15. These example modifications relate to alternative possibilities for integrating the electric machine EM1, although the example modifications can also be utilized, in a similar way, for the further electric machine EM2 in the transmissions G according to FIGS. 14 and 15. In FIG. 17, for example, the electric machine EM1 is not located coaxially to the particular gear set RS (not represented in greater detail here) of the transmission G, but rather is arranged axially offset with respect thereto. A connection takes place via a spur gear stage SRS, which is composed of a first spur gear SR1 and a second spur gear SR2. The first spur gear SR1 is connected at the second input shaft GW2 in a rotationally fixed manner on the side of the particular gear set RS. The spur gear SR1 then meshes with the spur gear SR2, which is located on an input shaft EW of the electric machine EM1 in a rotationally fixed manner. Within the electric machine EM1, the input shaft EW establishes the connection at the rotor (not represented further in this case) of the electric machine EM1.

Figure 18:
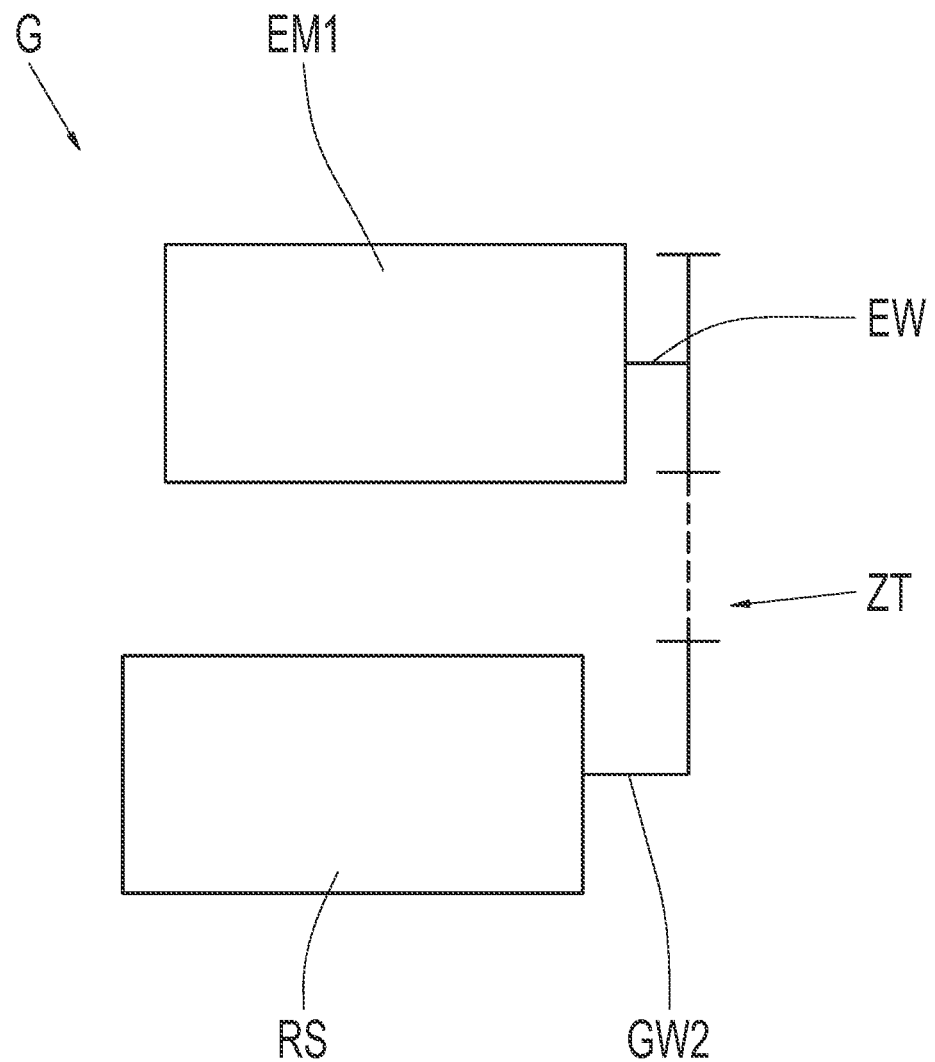

In the case of the example modification according to FIG. 18 as well, the electric machine EM1 is located axially offset with respect to the particular gear set RS of the particular transmission G. In contrast to the preceding example variant according to FIG. 17, a connection is not established in this case via a spur gear stage SRS, however, but rather via a flexible traction drive mechanism ZT. This flexible traction drive mechanism ZT can be configured as a belt drive or also a chain drive. The flexible traction drive mechanism ZT is then connected at the second input shaft GW2 on the side of the particular gear set RS. Via the flexible traction drive mechanism ZT, a coupling to an input shaft EW of the electric machine EM1 is then established. Within the electric machine EM1, the input shaft EW establishes a connection at the rotor of the electric machine.

Figure 19:
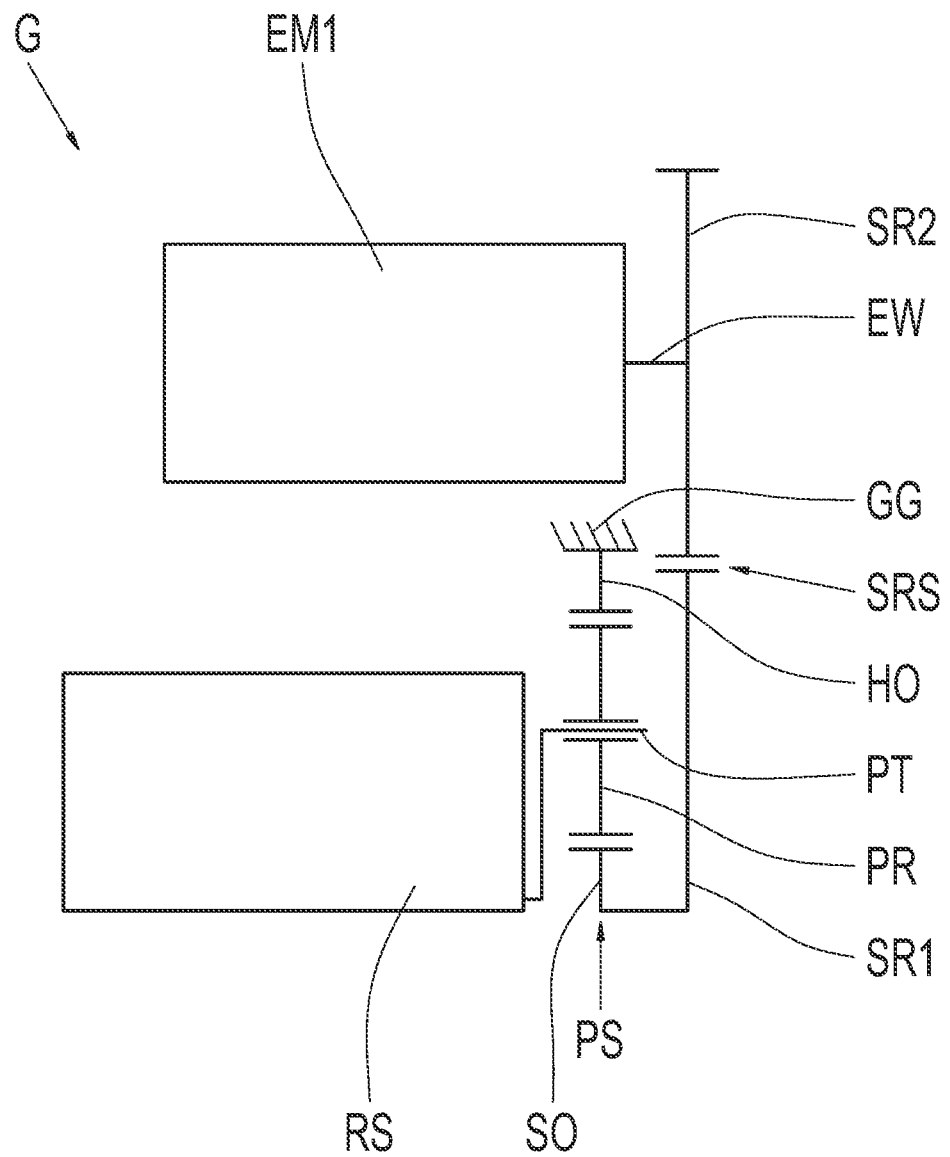

In the case of the example modification according to FIG. 19, an integration of the electric machine EM1, which is located axially offset with respect to the particular gear set RS, is implemented via a planetary gear stage PS and a spur gear stage SRS. The planetary gear stage PS is connected downstream from the gear set RS, wherein, on the output end of the planetary gear stage PS, the spur gear stage SRS is then provided, via which the connection to the electric machine EM1 is established. The planetary gear stage PS is composed of a ring gear HO, a planet carrier PT, and a sun gear SO, wherein the planet carrier PT guides, in a rotatably mounted manner, at least one planet gear PR, which is meshed with the sun gear SO as well as with the ring gear HO.

In the present case, the planet carrier PT is connected at the second input shaft GW2 in a rotationally fixed manner on the side of the gear set RS from FIGS. 2 through 12 as well as 14 and 15. By comparison, the ring gear HO is permanently fixed at the rotationally fixed component GG, while the sun gear SO is rotationally fixed to a first spur gear SR1 of the spur gear stage SRS. The first spur gear SR1 then intermeshes with a second spur gear SR2 of the spur gear stage SRS, which is provided, in a rotationally fixed manner, on an input shaft EW of the electric machine EM1. In this case, the electric machine EM1 is therefore connected by the gear set RS via two gear stages.

Figure 20:
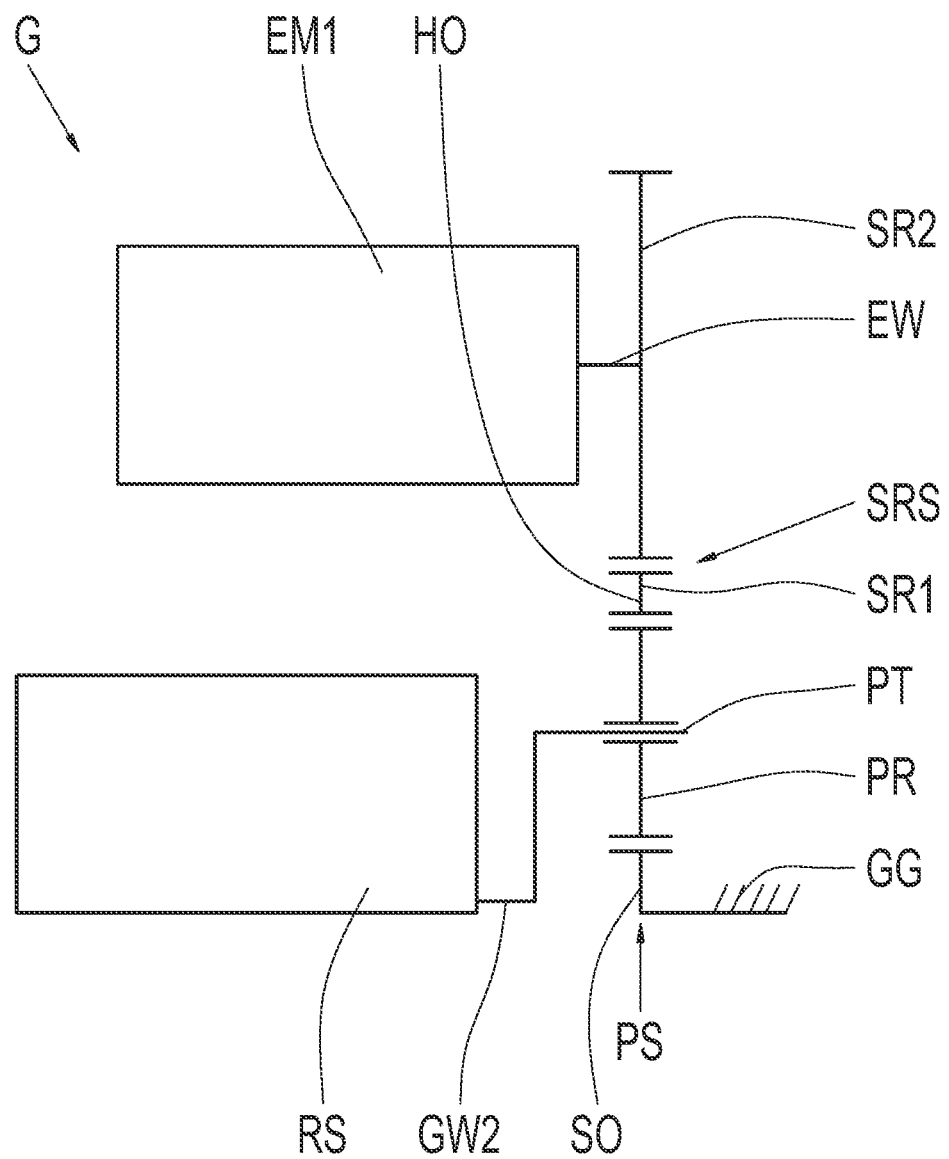

In the case of the example modification from FIG. 20 as well, an integration of the electric machine EM1 is implemented by the gear set RS via a planetary gear stage PS and a spur gear stage SRS. The modification largely corresponds to the example variant according to FIG. 19, with the difference that, with respect to the planetary gear stage PS, the sun gear SO is now fixed at the rotationally fixed component GG, while the ring gear HO is rotationally fixed to the first spur gear SR1 of the spur gear stage SRS. Specifically, the ring gear HO and the first spur gear SR1 are preferably designed as one piece, in that the ring gear HO is equipped, at an outer circumference, with a tooth system. For the rest, the example modification according to FIG. 20 corresponds to the example variant according to FIG. 19, and therefore reference is made to the description thereof.

Figure 21:
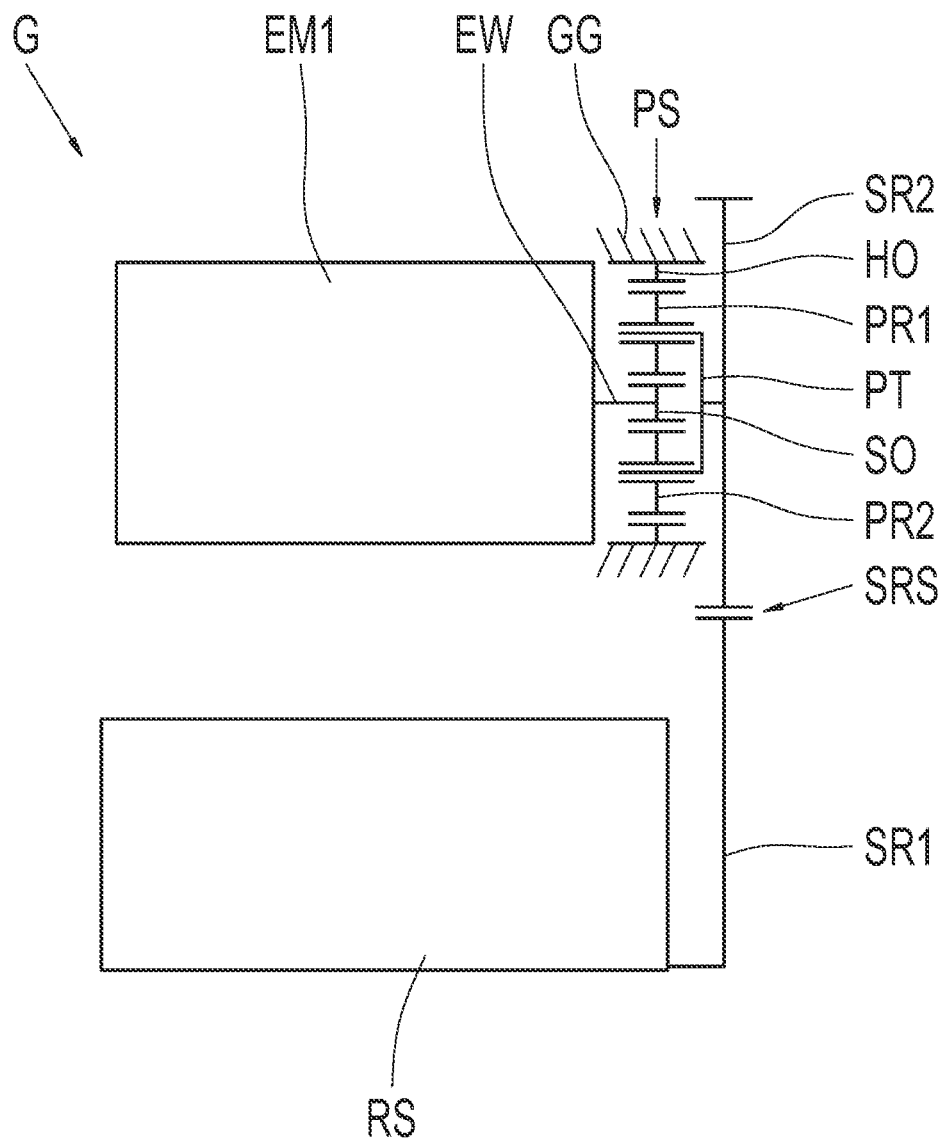

Moreover, FIG. 21 shows one further example modification of the transmissions G from FIGS. 2 through 12 as well as 14 and 15, wherein, in this case as well, an integration of the electric machine EM1 is implemented via a spur gear stage SRS and a planetary gear stage PS. In contrast to the preceding example variant according to FIG. 20, the gear set RS is initially followed here by the spur gear stage SRS, while the planetary gear stage PS is provided in the power flow between the spur gear stage SRS and the electric machine EM1. The planetary gear stage PS also includes, once again, the elements ring gear HO, planet carrier PT, and sun gear SO, wherein the planet carrier PT guides, in a rotatably mounted manner, multiple planet gears PR1 and PR2, each of which is meshed with the sun gear SO as well as with the ring gear HO.

As is apparent in FIG. 21, a first spur gear SR1 of the spur gear stage SRS is connected in a rotationally fixed manner on the side of the gear stage RS of the transmissions G from FIGS. 2 through 12 as well as 14 and 15, wherein this connection is completed at the second input shaft GW2. The first spur gear SR1 then intermeshes with a second spur gear SR2 of the spur gear stage SRS, which is rotationally fixed to the planet carrier PT of the planetary gear stage PS. The ring gear HO is permanently fixed at the rotationally fixed component GG, while the sun gear SO is provided, in a rotationally fixed manner, on an input shaft EW of the electric machine EM1.

Figure 22:
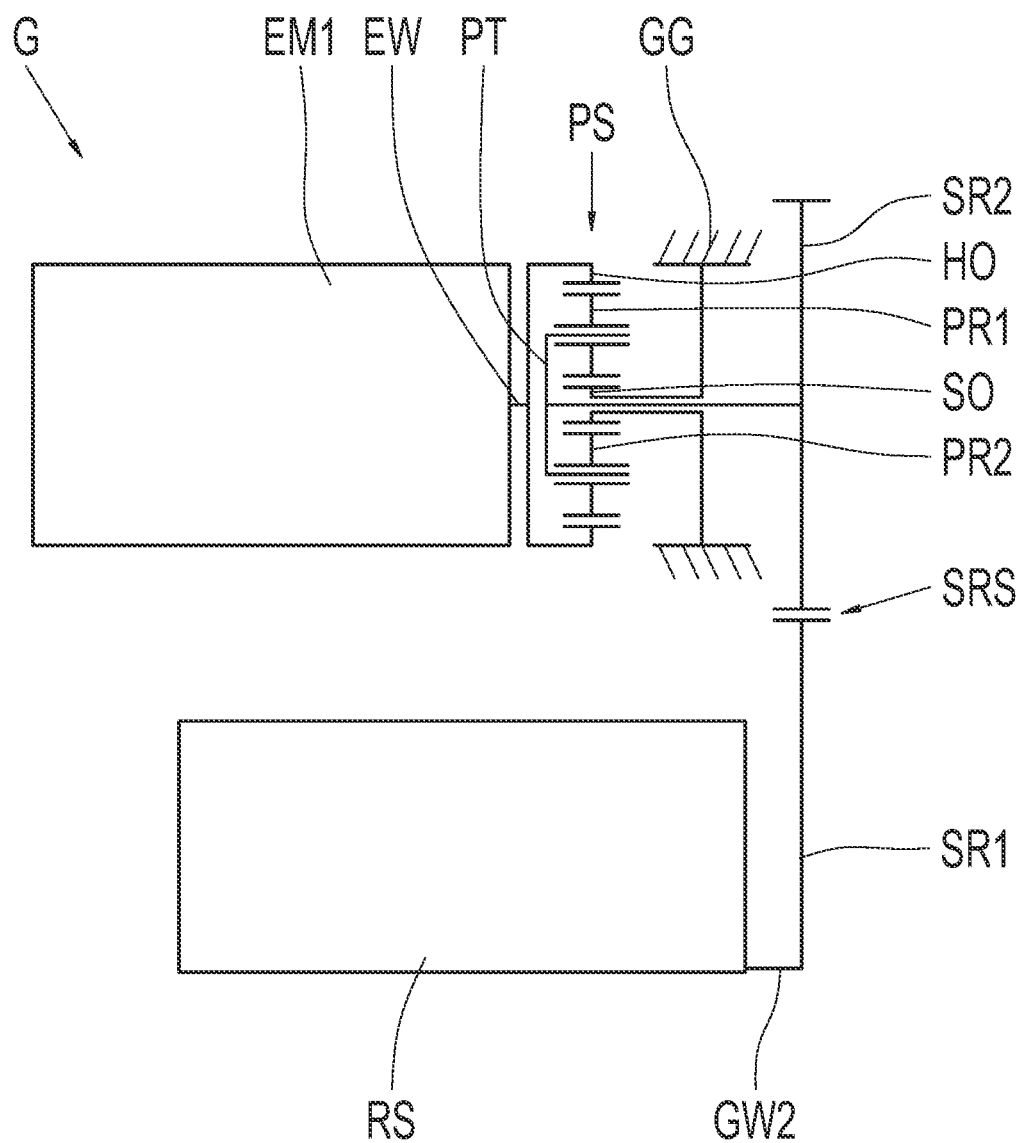

Finally, FIG. 22 shows one further example modification of the transmissions G from FIGS. 2 through 12 as well as 14 and 15, wherein this example modification essentially corresponds to the preceding example variant according to FIG. 21. The only difference is that the sun gear SO of the planetary gear stage PS is now permanently fixed at the rotationally fixed component GG, while the ring gear HO of the planetary gear stage PS is rotationally fixed to the input shaft EW of the electric machine EM1. For the rest, the example modification according to FIG. 22 corresponds to the example variant according to FIG. 20, and therefore reference is made to the description thereof.

By means of the embodiments according to the invention, a transmission having a compact design and good efficiency can be implemented.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

G transmission
RS gear set
GG rotationally fixed component
P1 first planetary gear set
E11 first element of the first planetary gear set
E21 second element of the first planetary gear set
E31 third element of the first planetary gear set
P2 second planetary gear set
E12 first element of the second planetary gear set
E22 second element of the second planetary gear set
E32 third element of the second planetary gear set
P3 third planetary gear set
E13 first element of the third planetary gear set
E23 second element of the third planetary gear set
E33 third element of the third planetary gear set
A first shift element
B second shift element
C third shift element
D fourth shift element
E fifth shift element
F sixth shift element
H further shift element
K0 seventh shift element
SP1 shift element pair
SP2 shift element pair
SP3 shift element pair
1 first gear
2 second gear
3.1 third gear
3.2 third gear
3.3 third gear
3.4 third gear
3.5 third gear
3.6 third gear
4.1 fourth gear
4.2 fourth gear
4.3 fourth gear
4.4 fourth gear
4.5 fourth gear
HZG auxiliary gear
E1 first gear
E2 second gear GW1 first input shaft
GW1-A mounting interface
GW2 second input shaft
GWA output shaft
GWA-A mounting interface
AN connection shaft
EM1 electric machine
S1 stator
R1 rotor
EM2 electric machine
S2 stator
R2 rotor
SRS spur gear stage
SR1 spur gear
SR2 spur gear
PS planetary gear stage
HO ring gear
PT planet carrier
PR planet gear
PR1 planet gear
PR2 planet gear
SO sun gear
ZT flexible traction drive mechanism
VKM internal combustion engine
TS torsional vibration damper
AG differential gear
DW driving wheels
I through XXX conditions

The invention claimed is:

1. A transmission (G) for a motor vehicle, comprising:
an electric machine (EM1);
a first input shaft (GW1);
a second input shaft (GW2);
an output shaft (GWA);
a first planetary gear set (P1), a second planetary gear set (P2), and a third planetary gear set (P3), each of the first, second, and third planetary gear sets (P1, P2, P3) respectively comprising a first element (E11, E21, E31), a second element (E12, E22, E32), and a third element (E13, E23, E33); and
a plurality of shift elements comprising a first shift element (A), a second shift element (B), a third shift element (C), a fourth shift element (D), a fifth shift element (E), and a sixth shift element (F),
wherein a rotor (R1) of the electric machine (EM1) is connected to the second input shaft (GW2),
wherein the first input shaft (GW1) is rotationally fixed to the second element (E21) of the first planetary gear set (P1),
wherein the output shaft (GWA) is rotationally fixed to the third element (E31) of the first planetary gear set (P1),
wherein the second input shaft (GW2) is connected in a rotationally fixed manner to the third element (E32) of the second planetary gear set (P2),
wherein the first element (E12) of the second planetary gear set (P2) is fixed,
wherein two of the first, second, and third elements (El 1, E21, E31) of the first planetary gear set (P1) are connectable to each other in a rotationally fixed manner via the second shift element (B),
wherein the first element (El 1) of the first planetary gear set (P1) is fixable by the third shift element (C),
wherein the second element (E22) of the second planetary gear set (P2) is bringable into a rotationally fixed connection with the first input shaft (GW1) via the fourth shift element (D), and
wherein the first input shaft (GW1) is connectable to the second input shaft (GW2) in a rotationally fixed manner by the fifth shift element (E).

2. The transmission (G) of claim 1, wherein:
the first element (E13) of the third planetary gear set (P3) is fixable via the first shift element (A);
the second element (E23) of the third planetary gear set (P3) is rotationally fixed to the output shaft (GWA);
the third element (E33) of the third planetary gear set (P3) is connected to the second element (E22) of the second planetary gear set (P2) in a rotationally fixed manner; and
the sixth shift element (F) is operable to selectively connect
the first element (E13) of the third planetary gear set (P3) to the second element (E23) of the third planetary gear set (P3) a rotationally fixed manner, or
the first element (E13) of the third planetary gear set (P3) to the third element (E33) of the third planetary gear set (P3) in a rotationally fixed manner, or
the second element (E23) of the third planetary gear set (P3) to the third element (E33) of the third planetary gear set (P3) in a rotationally fixed manner.

3. The transmission (G) of claim 2, wherein, by selectively engaging the plurality of shift elements (A, B, C, D, E, F):
a first gear (1) results between the first input shaft (GW1) and the output shaft (GWA) by actuating the first shift element (A) and the fifth shift element (E);
a second gear (2) results between the first input shaft (GW1) and the output shaft (GWA) by engaging the first shift element (A) and the fourth shift element (D);
a third gear results between the first input shaft (GW1) and the output shaft (GWA) in a first variant (3.1) by actuating the first shift element (A) and the second shift element (B), in a second variant (3.2) by engaging the second shift element (B) and the sixth shift element (F), in a third variant (3.3) by actuating the fourth shift element (D) and the sixth shift element (F), in a fourth variant (3.4) by engaging the second shift element (B) and the fourth shift element (D), in a fifth variant (3.5) by actuating the second shift element (B) and the fifth shift element (E), and in a sixth variant (3.6) by engaging the second shift element (B);
a fourth gear results between the first input shaft (GW1) and the output shaft (GWA) in a first variant (4.1) by actuating the first shift element (A) and the third shift element (C), in a second variant (4.2) by engaging the third shift element (C) and the sixth shift element (F), in a third variant (4.3) by actuating the third shift element (C) and the fourth shift element (D), in a fourth variant (4.4) by engaging the third shift element (C) and the fifth shift element (E), and in a fifth variant (4.5) by actuating the third shift element (C); and
an auxiliary gear (HZG) results by engaging the fifth shift element (E) and the sixth shift element (F).

4. The transmission (G) of claim 1, wherein:
the second element (E22) of the second planetary gear set (P2) is rotationally fixable to the output shaft (GWA) via the sixth shift element (F);
with respect to the third planetary gear set (P3), there is a first coupling of the first element (E13) of the third planetary gear set (P3) to a rotationally fixed component (GG), a second coupling of the second element (E23) of the third planetary gear set (P3) to the output shaft (GWA), and a third coupling of the third element (E33) of the third planetary gear set (P3) to the second element (E22) of the second planetary gear set (P2);

two of the first, second, and third couplings are permanently rotationally fixed connections, and a rotationally fixed connection is implementable for the remaining one of the first, second, and third couplings via the first shift element (A).

5. The transmission (G) of claim 4, wherein, by selectively engaging the plurality of shift elements (A, B, C, D, E, F):

a first gear (1) results between the first input shaft (GW1) and the output shaft (GWA) by actuating the first shift element (A) and the fifth shift element (E);

a second gear (2) results between the first input shaft (GW1) and the output shaft (GWA) by engaging the first shift element (A) and the fourth shift element (D);

a third gear results between the first input shaft (GW1) and the output shaft (GWA) in a first variant (3.1) by actuating the first shift element (A) and the second shift element (B), in a second variant (3.2) by engaging the second shift element (B) and the sixth shift element (F), in a third variant (3.3) by actuating the fourth shift element (D) and the sixth shift element (F), in a fourth variant (3.4) by engaging the second shift element (B) and the fourth shift element (D), in a fifth variant (3.5) by actuating the second shift element (B) and the fifth shift element (E), and in a sixth variant (3.6) by engaging the second shift element (B);

a fourth gear results between the first input shaft (GW1) and the output shaft (GWA) in a first variant (4.1) by actuating the first shift element (A) and the third shift element (C), in a second variant (4.2) by engaging the third shift element (C) and the sixth shift element (F), in a third variant (4.3) by actuating the third shift element (C) and the fourth shift element (D), in a fourth variant (4.4) by engaging the third shift element (C) and the fifth shift element (E), and in a fifth variant (4.5) by actuating the third shift element (C); and an auxiliary gear (HZG) results by engaging the fifth shift element (E) and the sixth shift element (F).

6. The transmission (G) of claim 1, wherein:

a first gear (E2) results between the second input shaft (GW2) and the output shaft (GWA) by engaging the first shift element (A); and a second gear (E2) results between the second input shaft (GW2) and the output shaft (GWA) by actuating the sixth shift element (F).

7. The transmission (G) of claim 1, further comprising an additional electric machine (EM2), a rotor (R2) of the additional electric machine (EM2) connected at the first input shaft (GW1).

8. The transmission (G) of claim 1, wherein the plurality of shift elements further comprises a seventh shift element (KO), the first input shaft (GW1) is rotationally fixable to a connecting shaft (AN) via the seventh shift element (KO).

9. The transmission (G) of claim 1, wherein the plurality of shift elements further comprises a further shift element (H), the first input shaft (GW1) rotationally fixable to the first element (E13) of the third planetary gear set (P3) via the further shift element (H).

10. A method for operating the transmission (G) of claim 9, wherein the further shift element (H) is engaged in order to implement a starting mode for forward travel during driving via the input shaft (GW1).

11. The transmission (G) of claim 1, wherein one or more of the plurality of shift elements (A, B, C, D, E, F; A, B, C, D, E, F, H; A, B, C, D, E, F, KO; A, B, C, D, E, F, H, KO) is a form-locking shift element.

12. The transmission (G) of claim 1, wherein one or more of the first, second, and third planetary gear sets (P1, P2, P3) is a minus planetary gear set, the respective first element (El 1, El 2, El 3) of the one or more of the first, second, and third planetary gear sets (P1, P2, P3) is a respective sun gear, the respective second element (E21, E22, E23) of the one or more of the first, second, and third planetary gear sets (P1, P2, P3) is a respective planet carrier, and the respective third element (E31, E32, E33) of the one or more of the first, second, and third planetary gear sets (P1, P2, P3) is a respective ring gear.

13. The transmission of claim 1, wherein one or more of the first, second, and third planetary gear sets (P1, P2, P3) is a plus planetary gear set, the respective first element of the of the one or more of the first, second, and third planetary gear sets (P1, P2, P3) is a respective sun gear, the respective second element of the of the one or more of the first, second, and third planetary gear sets (P1, P2, P3) is a respective ring gear, and the respective third element of the of the one or more of the first, second, and third planetary gear sets (P1, P2, P3) is a respective planet carrier.

14. The transmission (G) of claim 1, wherein the first shift element (A) and the sixth shift element (F) are combined to form a shift element pair (SP1) with an associated actuating element, and either the first shift element (A) or the sixth shift element (F) is actuatable from a neutral position via the actuating element.

15. The transmission (G) of claim 1, wherein the second shift element (B) and the third shift element (C) are combined to form a shift element pair (SP2) with an associated actuating element, and either the second shift element (B) or the third shift element (C) is actuatable from a neutral position via the actuating element.

16. The transmission (G) of claim 1, wherein the fourth shift element (D) and the fifth shift element (E) are combined to form a shift element pair (SP3) with which an associated actuating element, and either the fourth shift element (D) or the fifth shift element (E) is actuatable from a neutral position via the actuating element.

17. The transmission (G) of claim 1, wherein the rotor (R1) of the electric machine (EM1) is rotationally fixed to the second input shaft (GW2) or is connected to the second input shaft (GW2) via at least one gear stage.

18. A motor vehicle drive train for a hybrid or electric vehicle, comprising the transmission (G) of claim 1.

19. A method for operating the transmission (G) of claim 1, wherein only the fourth shift element (D) or the fifth shift element (E) is engaged in order to implement a charging operation or a starting operation.

* * * * *